(12) United States Patent
Kerstens et al.

(10) Patent No.: US 7,577,255 B2
(45) Date of Patent: Aug. 18, 2009

(54) PROXY METHOD AND SYSTEM FOR SECURE WIRELESS ADMINISTRATION OF MANAGED ENTITIES

(75) Inventors: Kevin Kerstens, Calgary (CA); Allan Van Schaick, Calgary (CA); Jim Doree, Calgary (CA)

(73) Assignee: Avocent Huntsville Corporation, Huntsville, AL (US)

( * ) Notice: Subject to any disclaimer, the term of this patent is extended or adjusted under 35 U.S.C. 154(b) by 0 days.

(21) Appl. No.: 11/445,244

(22) Filed: Jun. 2, 2006

(65) Prior Publication Data

US 2006/0218402 A1 Sep. 28, 2006

Related U.S. Application Data

(62) Division of application No. 10/326,226, filed on Dec. 19, 2002, now Pat. No. 7,454,785.

(51) Int. Cl.
  *H04L 9/00* (2006.01)
  *H04L 9/28* (2006.01)
  *H04K 1/00* (2006.01)

(52) U.S. Cl. .................. 380/270; 380/28; 380/267; 713/170

(58) Field of Classification Search ............ None
See application file for complete search history.

(56) References Cited

U.S. PATENT DOCUMENTS 5,249,220 A * 9/1993 Moskowitz et al. ...... 379/93.19

| | | | |
|---|---|---|---|
| 5,694,595 A | 12/1997 | Jacobs et al. | |
| 5,867,688 A | 2/1999 | Simmon | |
| 5,913,034 A | 6/1999 | Malcolm | |
| 5,929,792 A * | 7/1999 | Herriot | 341/55 |
| 5,941,988 A | 8/1999 | Bhagwat et al. | |
| 5,960,177 A | 9/1999 | Tanno | |

(Continued)

FOREIGN PATENT DOCUMENTS

EP 0898216 2/1999

(Continued)

OTHER PUBLICATIONS

Tabletmedia, Tabletmedia Delivers Voice Software to New Toshiba PDA Devices, Press Release, Oct. 27, 2003, California, US.

(Continued)

*Primary Examiner*—Kaveh Abrishamkar
(74) *Attorney, Agent, or Firm*—Davidson Berquist Jackson & Gowdey LLP

(57) ABSTRACT

A method, system and apparatus are described for avoiding the use of a web-server or generic security when providing network administration services remotely to managed entities using wireless technology. Instead a true Proxy device, not operating as a web-server, is used to pre-process all command traffic from wireless input devices (WID). The intervention between the WID and the managed entities of the Proxy isolating the managed entities from the WID, enhanced by encoding using a novel messaging protocol, further enhanced by a novel security model based on multiple pre-shared keys and algorithms together with identifiers and passwords that are not transmitted, achieves several bandwidth and security advantages including the ability to deliver TELNET services across the Internet and behind a firewall.

8 Claims, 10 Drawing Sheets

U.S. PATENT DOCUMENTS

| | | | |
|---|---|---|---|
| 6,085,227 A | | 7/2000 | Edlund et al. |
| 6,137,473 A | | 10/2000 | Cortopassi |
| 6,263,437 B1 | | 7/2001 | Liao et al. |
| 6,304,899 B1 | | 10/2001 | Cromer |
| 6,314,351 B1 | | 11/2001 | Chutorash |
| 6,334,150 B1 | | 12/2001 | Cromer |
| 6,680,730 B1 | | 1/2004 | Shields et al. |
| 6,681,250 B1 | | 1/2004 | Thomas et al. |
| 6,813,507 B1 | * | 11/2004 | Gress et al. ............... 455/466 |
| 6,862,708 B1 | * | 3/2005 | Higginbotham et al. ..... 715/500 |
| 7,009,952 B1 | | 3/2006 | Razavilar et al. |
| 7,010,294 B1 | | 3/2006 | Pyotsia et al. |
| 7,024,591 B2 | | 4/2006 | Moody et al. |
| 7,089,587 B2 | | 8/2006 | Allen et al. |
| 7,197,569 B2 | | 3/2007 | Dowling |
| 7,228,438 B2 | | 6/2007 | Bushmitch et al. |
| 7,394,761 B2 | * | 7/2008 | Foster et al. ............... 370/227 |
| 7,421,735 B2 | * | 9/2008 | Kerstens et al. ............. 726/12 |
| 7,454,785 B2 | * | 11/2008 | Kerstens et al. ............. 726/12 |
| 2001/0016907 A1 | | 8/2001 | Kang et al. |
| 2001/0047410 A1 | | 11/2001 | Defosse |
| 2002/0016829 A1 | | 2/2002 | Defosse |
| 2002/0046352 A1 | | 4/2002 | Ludwig |
| 2002/0052940 A1 | | 5/2002 | Myers |
| 2002/0059434 A1 | | 5/2002 | Karaoguz |
| 2002/0068559 A1 | | 6/2002 | Sharma et al. |
| 2002/0069259 A1 | | 6/2002 | Kushwaha |
| 2002/0078198 A1 | | 6/2002 | Buchbinder et al. |
| 2002/0083044 A1 | | 6/2002 | Kaplan |
| 2002/0095604 A1 | * | 7/2002 | Hausler ..................... 713/201 |
| 2002/0103850 A1 | | 8/2002 | Moyer et al. |
| 2002/0112046 A1 | | 8/2002 | Kushwaha et al. |
| 2002/0133746 A1 | | 9/2002 | Chen et al. |
| 2002/0193131 A1 | * | 12/2002 | Fleshler et al. ............. 455/507 |
| 2003/0003931 A1 | * | 1/2003 | Silventoinen et al. ....... 455/466 |
| 2003/0056096 A1 | | 3/2003 | Albert et al. |
| 2003/0061346 A1 | | 3/2003 | Pekary |
| 2003/0084331 A1 | | 5/2003 | Dixon et al. |
| 2003/0105854 A1 | | 6/2003 | Thorsteinsson et al. |
| 2003/0236983 A1 | | 12/2003 | Mihm |
| 2004/0019643 A1 | | 1/2004 | Zirnstein |
| 2004/0073791 A1 | | 4/2004 | Vollmer et al. |
| 2004/0083393 A1 | | 4/2004 | Jordan et al. |
| 2004/0171376 A1 | * | 9/2004 | Engstrom et al. ........... 455/419 |
| 2004/0187018 A1 | | 9/2004 | Owen et al. |
| 2005/0044184 A1 | | 2/2005 | Thomas et al. |
| 2005/0068191 A1 | | 3/2005 | Eschke et al. |

FOREIGN PATENT DOCUMENTS

| | | |
|---|---|---|
| GB | 2367709 | 4/2002 |
| WO | WO 01/91400 | 11/2001 |
| WO | WO 02/ 39299 A1 | 5/2002 |
| WO | WO 02/079983 | 10/2002 |

OTHER PUBLICATIONS

Intel Corporation, "Optimizing Rich Media IP Conferencing Systems," 2002.

Fujitsu Transaction Solutions Inc., "Fujitsu's iPAD to Use Tabletmedia's iFon Software for VoIP," Press Release, Apr. 2003, Texas, US.

NEC America, Inc., "NEC America to Integrate Tabletmedia's Software Client Into Its Internet Telephony Platforms," Press Release, Sep. 2002.

Tabletmedia, iFon, "VoIP and Video Communications on a Pocket PC," 2001-2002, California, US.

PCT Written Opinion of the International Searching Authority for PCT/CA2004/000633 mailed Jan. 7, 2005.

PCT International Search Report for PCT/CA2004/000633 mailed Jan. 7, 2005.

International Preliminary Report on Patentability from corresponding PCT Application No. PCT/CA2004/000633 issued on Nov. 4, 2005.

International Search Report from corresonding PCT Application No. PCT/CA2003/002036 mailed on Aug. 4, 2004.

Tabletmedia iFonTM Datasheet "The client for rich fixed-mobile convergence," Tabletmedia, Inc., San Francisco, CA, c2001-2006, 2 pages.

European Search Report in European patent application No. 03782045.3, dated Jan. 25, 2007.

"Wireless Application Protocol White Paper," Wireless Internet Today, Jun. 2000, XP-001069119, 18 pages.

Eun-Kyeong Kwon et al., "Integrated Transport Layer Security: End-to-End Security Model between WTLS and TLS," Information Networking, 2001. Proceedings, 15th International Conference on Jan. 31-Feb. 2, IEEE, 2001, pp. 65-71, ISBN: 0-7695-0951-7.

European Search Report in related European Application No. 03782045.3, dated Nov. 29, 2007.

Yoshihiro Ohba and Shinichi Baba, "PANA over TLS," Internet Draft, IETF Standard-Working-Draft, Internet Engineering Task Force, Sep. 2002, 26 pages.

* cited by examiner

Figure 8

255 → 4200 = SSH Connect ← 256

265 → R

| Parameter | Value |
|---|---|
| Server Name | The name of the Server to connect to |
| Domain Name | The name of the Domain on which the Server resides |
| Port | The port to connect to |
| Terminal Type | VT100, ANSI, TTY |
| Rows | 10..25 |
| Columns | 10..80 |

295 ↓

R4200 = Request SSH Connect

266 → A

| Parameter | Value |
|---|---|
| Prompt | The current command prompt |
| Result | The resulting output |

296 ↓

A4200 = Answer SSH Connect

Figure 9

Sample Code: _295_

R9000 = Get Key

Sample Message:
<H>2.7^3^!@#$%^&*^(*$&@</H>*^%$#@!)%$(%1+!#$%^&*()%$*$#%%#$%%##%#EOT Note: <H>, </H>, ^ = delimiters, and EOT = End Of Transmission Header of Message:
<H>2.7^3^!@#$%^&*^(*$&@</H> _285_

| | Parameter | Value | Possible Values |
|---|---|---|---|
| | client version | 2.7 | 2.5, 2.6, 2.7 |
| 275 | encryption type | 3 | (1 = none, 2 = rc4, 3 = 3des) |
| | WID ID | !@#$%^&*^(*$&@ | any valid WID listed |

Note: the WID ID has been encrypted with a 256 bit Secret Key 603 that the Proxy can use to read the WID ID located within the header portion of the sample message.

Message Payload:
*^%$#@!)%$(%1+!#$%^&*()%$*$#%%#$%%##%#EOT

Note: the message payload has been encrypted with a different key, being Communication Key 604 generated by using the WID ID and WID pass-phrase in a communications key algorithm loaded on each of the WID and the proxy.

Using the WID pass-phrase that the proxy has listed with the WID ID it has just recovered from the header, the message payload:

*^%$#!)%$(%1+!#$%^&*()%$*$#%%#$%%##%# decrypts to the following: _265_

R ← 
9000 ← _255_

| Value | Parameter | |
|---|---|---|
| 0 | Token 621 | (0 reserves a position) |
| kevinsRimDevice | WID ID 601 | |
| 12-06-2002 | Date | |
| 14:50:23 | Time | |
| 2.7 | Software Version | |
| 105 | Software Revision Number | |
| 1 | WID Type | |
| 58745875 | Integrity Checking Element (ICE) | |

Request
Get Key (including all associated actions)

PROXY METHOD AND SYSTEM FOR SECURE WIRELESS ADMINISTRATION OF MANAGED ENTITIES

CROSS-REFERENCE TO RELATED APPLICATIONS

This application is a division of application Ser. No. 10/326,226 filed Dec. 19, 2002 now U.S. Pat. No. 7,454,785, the entire contents of which are incorporated herein by reference.

This application is related to U.S. patent application Ser. No. 11/445,228, entitled, "Proxy Method and System for Secure Wireless Administration of Managed Entities," filed Jun. 2, 2006, the entire contents of which are incorporated herein by reference.

FIELD OF THE INVENTION

The present invention relates generally to wireless communication and particularly to remote access.

BACKGROUND OF THE INVENTION

Network administration services have become indispensable as businesses rely more heavily on Local Area Networks ("LANs") connected to the Internet to interact with their customers and their employees. Personnel capable of delivering those services are therefore in high demand and have accordingly become very expensive to maintain on staff. Mobile personnel able to provide high quality network administration services on a part-time basis, but on short notice, to more than one business are therefore a desirable resource when they are able to provide an essential service for an acceptable price. Further, keeping mission critical technical infrastructure functioning correctly in times of a threat—one example is where a threat to a building forces the evacuation—all the critical systems and infrastructure are left inside the building while the IT (information technology) staff are outside—unable to take the actions necessary to protect the network by performing administration functions including locking down core systems and users.

Without dedicating costly office space either on or off-site, or any other form of physical infrastructure that unnecessarily restricts the location of operation of a service or the mobility of the personnel supply those services, wireless technologies are a desirable means through which to deliver network administration services. Unfortunately, conventional methods of wireless communication are insufficient (in both capacity and security) for use administering networks such as LANs.

Known conventional technologies for administering networks wirelessly include those accessed through a web browser, using a standard micro-browser client/application running on any of a variety of PDAs (Personal Digital Assistants), pagers, data capable cell phones or other Wireless Input Devices ("WIDs") to access a web-server connected to the LAN or other network of managed entities whether in hardware or in software (including: servers, routers, desktops, modems, printers, switches, mainframes, serial or parallel devices, pagers, data capable phones, applications, services, or processes). These traditional approaches take advantage of existing infrastructure to provide an inexpensive and flexible (i.e., client WIDs need not be prepared or have client software loaded) way to access managed entities, but disadvantageously increase the risk of unauthorized access to the LAN through the web-server component of the service, a risk that is not acceptable to many businesses.

Wireless Transport Layer Security (WTLS) is based on Transport Layer Security (TLS) (similar to Secure Sockets Layer, SSL). WTLS was developed to address the problems of mobile network devices, including: narrow bandwidth, high latency environment, limited processing power and memory capacity. TLS was modified to address the needs of wireless users because radio networks do not provide end-to-end security. TLS is a protocol that is the successor to SSL. TLS has two layers: the TLS Record Protocol and the TLS Handshake Protocol. The Handshake Protocol allows the server and client to authenticate each other and to negotiate an encryption algorithm and cryptographic keys before data are exchanged. The Record Protocol provides session security using a particular method of encryption such as the Data Encryption Standard (DES), but can be used without encryption. TLS and SSL are not generally interoperable, but TLS can export for SSL.

Wireless Application Protocol ("WAP") uses a specially developed protocol stack to implement the part of the wireless transmission from a WAP client device to a WAP Gateway. The WAP architecture replaces the current web server technology for the portion of data communication between a wireless device and the web server. A WAP Gateway implements the Internet protocol stack on behalf of the WAP client device. Since TCP/IP is not used for communication between the WAP client and the WAP Gateway, SSL or TLS could not be used to implement the security. WTLS can sustain the low bandwidth, high latency transport layer and is derived from TLS by removing the overhead where possible without compromising security that makes the protocol suitable for the wireless environment. Like TLS, WTLS operates on top of the wireless transport layer also known as WDP, and below the session layer known as WSP. However, WTLS runs on top of an unreliable datagram service, and not a reliable transport protocol like TCP/IP, creating reliability concerns respecting message exchanges across several WTLS operations. WTLS also uses digital certificates to provide for server or client side authentication, but due to the memory limitation of WAP devices certain desirable attributes are omitted from the digital certificate specifications, including the Serial Number and Issuer ID fields. A WAP Gateway is responsible for the translation of messages from one protocol to another. Just like it encodes text based WML (Wireless Markup Language) content into binary WML format before sending it on its way on the air, it has to decrypt TLS encoded messages, convert the content into binary format, encrypt it using WTLS and then send it on its way. The same happens when the message arrives from the WAP device. It must be decrypted, decoded and the resulting WML re-encrypted using TLS specifications and then forwarded to the applications server. Consequently, the WAP Gateway sees all messages in clear text, including messages intended to be confidential throughout the transmission are exposed for a split second, and that is what is known as the WAP Gap, which can be addressed by setting up an internal WAP Gateway accessible only by users of the application and configuring devices to use the new gateway for access to WAP content. Although some WAP devices support multiple gateway configurations, switching between them as the users navigate from one application to another is difficult. Most companies that deploy an end-to-end secure solution require their users to carry phones with pre-set gateway configurations and access to WAP applications hosted on their servers only. Despite the recent advent of WAP v. 2.0, this is currently the only known way to ensure end-to-end secure communications between a WAP device and an application server.

The web protocol used to communicate between the web-server and the micro-browser depends on the type of WID deployed. Some WIDs are capable of handling HTML such that they can be used for "direct access" to the web-server. Other WIDs are designed or set up to handle the more compact WML, such that, although their speed of operation is higher, they must access the web-server through a WAP Gateway making them subject to the WAP gap. Some conventional web-server implemented wireless services operate without encryption, while others use generic forms of encryption such as SSL or TLS, or deploy a third party VPN (Virtual Private Network) security product to connect to the service to the necessary web-server. FIG. 1 illustrates the prior art use of a wireless input device ("WID") running a generic micro-browser the output for which is in WTLS, communicating by radio means, typically a cellular network, through an Internet Authentication Services ("IAS") Server that authenticates the wireless user who is provided with access to the internet, through a WAP gateway that must convert from WTLS to TLS before transfer over the Internet, to a web-server that is relatively exposed to attack because Port 80 remains "open" in order for a web-server to be accessible round the clock for requests from unknown sources, and by virtue of which so-called crackers have a point of access to anything logically connected to web-servers. Use of such system to provide LAN Admin services is necessarily risky because the web-server must have access to the LAN in order to pass Admin instructions from a WID to any server on that LAN. It is therefore desirable not to use a web-server for network administration applications.

Proxy technology is well-known in the computing industries as a means to reduce the number of points of access by or to a LAN from the Internet. For example, commonly, proxy technologies are used as a "gateway" permitting client devices that are "sealed off" from the Internet a trusted agent that can access the Internet on their behalf, such gateway often running with a firewall positioned as a barrier to crackers. In the case of a proxy gateway the proxy technology has been applied as a "stand-in" or "proxy" for the client. In another example of a common use for proxy technology the "proxy" is applied for a server wherein caches of files that are popular are loaded onto a proxy server to fill requests for files originally from a machine that may be slower or more expensive to operate. In both cases, the true concept of proxy technology is based on a machine that actually does something on behalf of another machine, unlike a router that merely makes connections between end points permitting the machines at those points to conduct their own affairs.

FIG. 2 illustrates the prior art use of an intermediate server (as a router) to eliminate the use of a web-server and the WAP gap. However, even these newer technologies suffer a number of disadvantages. For example, such newer conventional means for wireless network admin rely on the generic, industry standard SSH (Secure Shell) protocol and its security layer SSL both of which are vulnerable to crackers. Further, SSH is interpreted character by character, causing a large volume of data transfer and work on the client WID interpreting messages sent using the SSH protocol, neither of which is desirable in the narrow-bandwidth, low-capacity world of portable computing devices. Similarly, SSL can only run on an SSL-enabled WID and requires that security operations (as well as device management, and service functionality) be performed by the managed entity (e.g., a server on the LAN having business processes that it must run and that are thereby already consuming processor power or other system resources) running the SSH service. Consequently, even though some conventional SSH technologies include a machine intermediate the firewall and the LAN, that machine is restricted to operate as a router rather than as a true proxy, since its purpose (even though it may be implemented with some gateway functionality) is to provide a single point of entry through the firewall, eliminating the need for a different port in the firewall to be opened for each managed entity requiring access to WIDs outside the firewall.

Typically, an SSH-based client is installed on each WID for communication with a machine that is not a web-server, but which merely (like a router) forwards network administration traffic without further processing, screening or handling—directly to the managed entities. Disadvantageously, in order to handle SSH-based traffic each managed entity must run an SSH service. The use of SSH to deliver operating system ("OS") level calls to each managed entity is very restrictive, limiting the variety of operations that may be executed from SSH without an additional soft agent to convert from and enhance the older style command line interface of SSH. SSH is also known as "Secure Shell", a UNIX™ shell program for providing secure encrypted communication between untrusted hosts over an insecure network for the purpose of logging into, and executing commands on a remote computing device. However, although SSH is available as a service for Microsoft Windows® and UNIX™ servers, if the SSH service is not running on the managed entity at the time access by the WID is required, or the managed entity is not responding at all (e.g., the administrative service is required because of a runaway process, or an overloaded CPU), then there is no way to communicate with the subject managed entity using SSH.

SSH is a limited industry standard protocol requiring a separate application to extend the number of commands that may be executed and the administrative work that may be performed when using it. Although the SSH Command Line interface is very powerful, it is very keystroke oriented and requires a highly-skilled operator to apply it effectively, especially using the small keyboard and screen of a typical handheld WID. Although it is possible to write a program to run a WMI (Microsoft Windows Management Instrumentation) command within SSH and then use SSH to execute the program on a managed entity, it is very difficult to do. For standard admin applications that do not expose all functionality through the command line (e.g., accessing Microsoft Windows' mailboxes, rebooting a Microsoft Windows® server) it is very awkward to use those applications via SSH. Despite the fact that macros or batch files can be written to reduce the typing required to execute a particular function, those macros must also be stored on the WID and the managed entity.

SSH is basically an encrypted version of TELNET, which are the only ways to remotely access UNIX™ servers for admin purposes—making them not only helpful, but also necessary. Unfortunately, SSH is also an extremely dangerous service to leave running on a server since its expert user, command line access design is very powerful and unforgiving—potentially allowing essential files to be deleted and wiped from drives that may also be reformatted with no "user friendly" warnings, backups, or means for recovery. Consequently, many network administrators will not permit SSH services to run on their networks and it is desirable to implement network administration without resort to SSH.

Disadvantageously, whenever the need to deliver these services wirelessly arises, Telnet and SSH are very powerful tools that can be misused to cause great disruption to the network on which they run. Conventionally, in order to access Telnet/SSH remotely there are three options: 1) open a port in the firewall for each managed entity, 2) use a server to act as a router, or 3) open one port for one Telnet/SSH server and have users Telnet/SSH from one server to another. In all 3 cases the security of the system relies on the strength of the well-known, well-understood SSH model based on a simple user ID and password. To enhance that conventional security model: the firewall can be configured to allow access to the Telnet/SSH port only via restricted IP (Internet Protocol) addresses, or a VPN solution can be used to tunnel between a remote location and the Telnet server. Many companies find the firewall solution too restrictive and the VPN solution too complex or costly. Consequently, there is a need for a solution to securely deliver Telnet services remotely to a point behind a firewall for a reasonable price.

Authentication is the process of attempting to confirm whether an entity (e.g., a device or a user) is, in fact, what or who it has been declared to be. Authentication is commonly done using identifier (e.g., user name) password combinations, the knowledge of which is presumed to guarantee that the user is authentic. Each user's password is initially registered, providing a measure of verification. However passwords can thereafter be stolen, intercepted, accidentally revealed, or forgotten. The more levels of authentication, the higher the level of confidence that the entity successfully providing all "keys" is authentic. Logically, authentication precedes authorization although they may often appear to be combined. Authorization is the process of confirming that an entity has permission to do or have something, for example, to give certain commands or to access to specific managed entities (e.g., servers) or files. A person of skill in the art would understand that authorization may take place at any or all of the network operating system (NOS), computer operating system (OS), or application levels.

Typically authentication takes place without encryption, the keys for which may be negotiated once the host confirms the identity of the entity being authenticated. Typically authentication is carried out for the user alone and not for the device, which, in the context of mobile devices, has the disadvantage of permitting stolen devices to remain a threat against which there is no direct protection. It is therefore desirable to engage authentication means respecting mobile input devices. A hardware element commonly referred to as a "dongle" is one known means for uniquely identifying computing devices.

Integrity, in terms of data and network security, is the assurance that information has only been accessed or modified by persons authorized to do so. Common network administration measures to ensure data integrity include the use of checksums to detect changes to file content.

The OSI or "Open Systems Interconnection" model comprises seven (7) specific functional layers, being: Application, Presentation, Session, Transport, Network, Data Link and Physical. Two of those layers (Session and Transport) are particularly important to wireless network administrators because it is at these layers that security problems arise when using only the generic forms of processing, created for end users (i.e., not Administrators) completing business transactions, are misapplied in order to enjoy flexible access for an Administrator's tool. IP is considered to be at the Network Layer, while TCP is at the Transport Layer. The higher level Application, Presentation and Session Layers (where FTP/SMTP/TELNET/SNMP/NFS/RPC run) combined are commonly referred to as the Process Layer, consequently FTP, SMTP, and TELNET are said to "run over" TCP and IP.

Transport Control Protocol ("TCP") has been designed to be reliable, meaning that all (i.e., none missing) data packets will arrive in sequence and error-free. Internet Protocol ("IP") has been designed to establish a "session" connecting remote stations and to maintain that session until all of the required data packets have been transferred. Although not all implementations of TCP/IP are alike, it is the use of a standard form of TCP/IP that permits a wide range of networks to share information regardless of the physical connection or hardware involved. Despite the difference between "dialects" of TCP/IP each dialect has a generic base that includes FTP (file), SMTP (mail) and TELNET (for terminal emulation). The combination TCP/IP is necessary to use the Internet to move commands between a mobile client and a managed entity—whether presentation is in HTML, WML, or through a GUI, and whether security is achieved using generic SSL, TLS, or WTLS, or through a security model—consequently, it is desirable to ensure that whatever is output by the WID is in a form that requires minimal processing to "run over" TCP/IP.

HTML and more recently XML are OSI Presentation Layer languages including a full suite of formatting commands recognized by generic browser clients for general use on modern desktops and other powerful machines having broadband access to the Internet. XML and WML are presentation language options neither of which is necessary unless a generic browser or microbrowser is involved in the system.

TLS is replacing SSL, in the OSI Transport Layer, as the industry standard for encryption when using TCP/IP to move packets securely across the Internet. Since most web content development now contemplates broadband access, in order to enhance performance on low-power, limited-capacity, narrowband wireless devices, WAP has evolved as a subset of rules permitting wireless devices to more efficiently access such graphics-heavy content. WML (Wireless Markup Language) is a set of Presentation Layer commands based on XML and HTML, intended for use in specifying content (and a scaled down user interface) for narrowband devices for which reduced graphic content is appropriate. WTLS (Wireless Transport Layer Security) is the WAP variation on TLS available for use as the Transport Layer standard for generic security during the "wireless leg" of transmissions between a client and a managed entity. However, WTLS is not required for carrier dependent transmission to occur, which various implementations of WDP achieve without encryption being applied at the socket level. For example, a simple wireless device sending public information not needing to be encrypted could be used to send presentation instructions written in HTML to a web-server for display. The characters comprising the HTML would be processed for transmission in accordance with the radio carrier's particular radio network (and WDP) on the other end of which radio network they would be "de-processed" in preparation for uploading to "run over" TCP/IP across the Internet, without security. In the more common example of a sensitive message originating on a wireless device, characters written in WML (but they could be in HTML) would be encrypted at the socket level (as opposed to by the client application per se) using (generic) WTLS and then also processed in accordance with the carrier's particular radio network for transmission over the wireless portion of the journey to the message's destination. Upon reception at the radio carrier's tower, the message must be de-processed from the earlier radio network specific processing—and then also decrypted from WTLS (for conversion to TLS), since current technologies do not permit WTLS encrypted packets to be sent over the Internet on TCP/IP. Decryption from WTLS takes place on a WAP Gateway (typically supplied by an Internet carrier) that is inherently "public" in nature. It is during the time between the decryption from WTLS and re-encryption to TLS that a "gap" in security occurs that has become known as the "WAP gap". During the interstitial period the characters in WML would sit in an unencrypted form on the WAP Gateway exposed to so-called "sniffers" or other tools used by crackers to "listen" to known weak points in the Internet for subject matter of interest. Even though TLS and WTLS are "strong encryption" options, neither of them is necessary if an alternate means of security has been implemented to avoid the WAP gap. It is therefore desirable, particularly for network administration applications, to transmit information and commands using a system that does not rely on WTLS alone for security.

An application programming interface" ("API") is the set of calling conventions by which an application such as a network administration client accesses the operating system ("OS") and other services. There are currently three conventional programming interfaces that permit network operators to access Microsoft Windows® operating systems for the purpose of providing administrative commands to managed entities: WIN32, ADSI and WMI (CIM). Conventional remote administration technology delivers commands (e.g., reboot), through a web-server, using these interfaces directly to the managed entity that executes without further enquiry— such that a risk of the unauthorized deliver of such commands exists. A person of skill in the art would understand that various of these may be implemented as a device driver rather than a memory-resident program.

There are currently three main problems associated with using wireless technology to remotely administer a computing network. First, the need to transmit signals through open space creates a security problem because the signals are susceptible to interception. Second, the narrow bandwidth of current input device technology (e.g., pagers, PDAs, phones) makes data exchange slow. Third, the fragile connectivity of current radio communication networks makes data exchange unreliable. Both slow and unreliable data exchange are severe practical limits on the administrative services deliverable.

To reduce the amount of data being transferred between a WID and its server, one conventional approach is to store more (LAN) information on the WID, which disadvantageously creates a serious security risk to the LAN in the event that the highly-portable WID is stolen. It is therefore desirable to provide a solution that requires neither extensive transfers nor the storage of LAN data.

Conventionally authentication takes place without encryption, the keys for which may be negotiated once the host confirms the identity of the entity being authenticated. Authentication is also carried out for the user alone and not for the device, which in the context of mobile devices has the disadvantage of permitting stolen devices to remain a threat against which there is no direct protection. It is therefore desirable to engage authentication means respecting the mobile input devices as well.

The prior art respecting the wireless administration of networks has concentrated on teaching variations on the application of generic access and security technologies.

SUMMARY OF THE INVENTION

The system aspect of the present invention avoids the use of a web-server and generic security to access a LAN, instead using a Message Processor that operates as a true proxy device to pre-process all command traffic, achieving several advantages. Said system is further enhanced by combining the foregoing novel method of using a proxy with a novel security model and a novel messaging protocol for the secure Wireless Administration of managed entities, including the novel secure delivery of TELNET services across the Internet and behind a firewall.

The method aspect of the present invention uses a soft client installed on each WID for communication with a proxy server (avoiding the high-risk use of a web-server) that is used to screen and otherwise pre-process all encoded traffic from each WID.

Advantageously, rather than merely forwarding network admin traffic to managed entities, the encoded messages are decrypted and the encoding "expanded" (i.e., the mapping is reversed) by the proxy into any suitable combination of standard WMI, ADSI, or WIN32 commands that are delivered directly to the OS of the appropriate managed entity, thereby eliminating a significant portion of the processing burden from each of the WID and the subject managed entity. Further, since the WID is not merely redirected so as to connect to a managed entity, it is not necessary to transfer the LAN identifiers (e.g., user ID and user Password) in the subject SSH message along with a command sequence. Further, without the complexity of and restrictions imposed by SSH, a full suite of OS level calls are available conveniently, thereby increasing the variety of operations that may be remotely executed on each managed entity by even less skilled users.

Messaging Protocol

A Wireless Input Device ("WID") client must exchange information with a server ("proxy") in order for commands from the user of the WID to reach the devices ("managed entities") being administered. The more information captured in each data packet exchanged, the fewer the packets the WID must prepare, send, receive, and process. Advantageously, to reduce the number of packets being transferred between the WID and the proxy, the method aspect of the present invention uses a form of "shorthand notation" (basically overlaying a code on select commands that are organized in various sizes of groups of commands) according to which each message is encoded by applying a symbolic representation of one or more commands recognizable by the subject managed entity (e.g., for common computing devices this would include standard operating system commands). By so "encoding" the WID's transmission of common network commands (e.g., R9000=Get Key, R9001=Logon user) the resulting abstraction permits the proxy to complete a significant amount of processing based on information that the WID is advantageously not required to store. For example, although the system of the present invention applies the well-known WIN32, ADSI and WMI programming interfaces (when administering LANS based on Microsoft Windows), none of those network dependent collections of data are required to be resident on or handled by the WID.

Unlike simple macros or batch files, the "shorthand" of the present invention contains less than a full set of the information required to execute a particular operation (session transaction) that requires a number of individual (WMI, ADSI, WIN32) commands and parameters, which number depends on the particular operation. Only a code identifying each requested operation together with the parameters that must be supplied for that operation—are transmitted (after being protected according to the security model described below), and all processing that need not be done on the WID is done behind the firewall by the much more powerful proxy server. The proxy "expands" the shorthand by processing or interpreting the code into a sequenced list of individual commands together with the parameters necessarily supplied by the WID. Upon expansion, the proxy can determine what further parameters (e.g., LAN Administrator ID and Password) it requires and obtain them, as well as take any precautionary (e.g., delay execution, or backup) steps that are appropriate based on the nature of the operation that it is about to instruct a managed entity to execute over the LAN. Upon the managed entity completing the requested operation, the proxy may automatically execute a further series of network admin operations to locally confirm the status of the managed entity—all without requiring further intervention necessitating data exchange with the WID, instead reporting to the WID only the essential information remotely confirming status or requesting further input.

Advantageously, if intercepted, the codes and parameters are meaningless to anyone except the intended recipient and when received by the intended recipient provide both efficiency and additional security, because the proxy identifies and expands the code into the associated block of interface commands and (parsed) parameters that it alone can submit directly to its managed entities.

According to one aspect of the invention, there is provided a method of encoding commands for the purpose of preparing an administrative message for transmission between a wireless input device and a managed entity, comprising the steps: map at least one command to an identifier comprising a first symbol, map at least one parameter to each said first symbol, map at least one value to each said parameter, create a first symbol-second symbol combination by appending a second symbol to said first symbol for the purpose of defining whether the transmission of said first symbol-second symbol combination is a request for or a confirmation of compliance, define a sequence according to which said first symbol-second symbol combination will be positioned within said message relative to said value of each said parameter, and assemble said message using said first symbol to represent at least one command recognized by said managed entity, and arranging said first symbol-second symbol combination together with said value of each said parameter in accordance with said sequence.

Security

The security method aspect of the present invention is based on a combination of key management and prudent storage. Secret, Site, Communications and Session Keys, are applied together with Hashing and Tokens through an embedded client software application on the WID (any suitable computing, paging, phone, or other mobile device) that stores minimal information in an encrypted form and authenticates each of the user and the WID separately, advantageously making it possible to "lock out" stolen or missing WIDs. The novel use of a separate pass-phrase for the WID further strengthens authentication by making it harder for crackers to discover all of the elements that they require to attack a system. Even if a cracker were to obtain useful elements of access information, the subtle use of the software version number and other details shared between the WID and its proxy permit the system to select and switch key algorithms and hash functions periodically forcing crackers to "start over".

By applying a number of different "keys" (some pre-shared, some generated as required) in sequence the resulting additional layers of security makes it dramatically less likely that a cracker will intercept or otherwise acquire all of the elements necessary to gain access to an administered network in time to do any harm. A unique device ID and pass-phrase or PIN (a.k.a. MAN) for each WID makes it possible to for a user to Logon with a measure of security already in place when the unique user ID and password or PIN, are submitted by the user. Further, the security that is then in place is rather than generic socket level security, which security is less familiar to crackers and may be changed from time to time (e.g., with new versions of the application) each adding a further barrier to unauthorized access. Advantageously, once device or user identity has been confirmed further authentication is implicit in the ability of the client to successfully engage any number of additional keys to communicate by encrypted means.

By also using passwords and pass-phrases as "seeds" to generate more complex "keys" for use in place of traditional passwords and pass-phrases, while never caching or otherwise storing passwords and pass-phrases per se, the resulting abstraction makes it substantially less likely that these necessary elements will be guessed, cracked, or otherwise discovered. In some cases an algorithm (that may be changed periodically) is supplied to each of the WID and the proxy at the time the WID is initialized for the network to be managed, while in other cases a one-way Hash function is supplied to generate a very strong hash value based on a simpler user ID and user password, which ID and password therefore need not be stored on or transmitted from any mobile device.

Since, when using a network administration application wirelessly, keys will be intercepted and crackers are motivated to break those keys to access the networks that the application is used to administer—there was a need (in addition to the Secret Key) for a Site Key that was both strong and unique to every installation of the application or even to each WID-proxy combination at every installation. The problem was to find a way to reliably use a strong key between the WID and its proxy, since all strong encryption keys include characters from the entire ASCII range, a majority of which are not available on a standard keyboard. Even if keyboard input was an option, entering a 32-byte (256-bit) key is prone to human error, leading to significant usability issues. The solution of the present invention is to provide each WID-proxy combination with a communications key algorithm to generate a Communications Key as needed, rather than to provide the key itself, which, like certificates would need to be stored. This algorithm would combine the relatively simple and mnemonic WID ID and WID pass-phrase to generate a unique and relatively complex 32-byte (256-bit) key that, if intercepted, would be much more difficult for a cracker to access and use. Since the communications key algorithm is loaded onto the WID and its proxy, and is never legitimately transmitted, the algorithm is at low risk of being available to crackers by interception or otherwise. Further, since the WID pass-phrase is never transmitted, even upon intercepting the key, a cracker has insufficient information from which to reverse engineer the elements required to spoof the WID in order to gain access to the proxy that sends commands to the managed entities.

By further using identifiers (e.g., ID and password or pass-phrase) that are unique to the network administration service, no LAN related access information is required by the mobile WID. Although the method and system aspects of the present invention are compatible with and contemplate the option of allowing LAN access information being used rather than identifiers unique to the service, advantageously, the isolation permitted by the use of unique identifiers makes it less likely that a cracker may intercept LAN information useful for attacking the subject LAN even outside the wireless environment. Further, since WIDs are commonly lost or stolen, no identifiers or LAN information are stored or even cached on the WID, and the WID ID and WID pass-phrase are stored on the WID only in a database that is maintained in an encrypted (typically using the Secret Key) form.

By further using tokens to validate each transaction (or operation) within a session, "replay" attacks may be prevented. Once authentication and authorization are complete, a session may commence, secured by the session key supplied by the proxy together with a first token that must be returned by the client to complete the next transaction (e.g., logon user). Although an ACK response must also sent from the WID to the proxy each time a packet is received, advantageously, according to the security method of the present invention a valid token must accompany each transaction including commands that the user wishes to execute—and the proxy will not deliver the commands (extracted from the message) to any managed entity until a valid token is supplied by the WID. Advantageously, to prevent spoofing, a transaction will be denied if the token returned by the WID does not match the token provided to the WID. If more than one valid token (maintained in an array in the order that they are generated) has been sent by the proxy, then all of the prior tokens will expire or be cancelled by the proxy upon its receipt of a more recent token. The proxy also removes all prior tokens from the array when confirmation of receipt of a transaction is received, which is indicated by receipt from the WID of the ACK respecting the final packet of the subject transaction.

The novel use of the ACK "handshake" addresses the problem of dropped packets without flooding the network with unsolicited resends. After a configurable time (e.g., 10 minutes) the proxy will terminate the session unless it receives an ACK from the WID. Similarly, the WID may request a resend of a packet that it was expecting (e.g., due to an EOB suggesting that the message has been broken into blocks) but had not yet received.

By further isolating the managed entities from the WID, using an intermediate message processor (e.g., a proxy server) to receive, decrypt and decode all encrypted and encoded messages from the WID, details respecting the existence of the managed entities become less readily available—making them more difficult to "see" as prospective subjects for an attack.

A person of skill in the art would understand that security is further enhanced by embedding the client software application into the WID and providing it with data that are never transmitted, while also imposing IP port and address restrictions and encrypting all necessary transmissions, further providing SSH and NTLM authentication, and a full audit trail and logging of all activity on every proxy and every WID making it easier to identify security problems.

According to one aspect of the invention, there is provided a system, for securing communication between a WID and a proxy having access to an encrypted service database for storing information respecting said WID and information respecting at least one user of said WID, comprising: an identifier for said WID, stored encrypted on said WID and stored unencrypted in said service database, a password for said WID, stored encrypted on said WID and in said service database, a secret key pre-shared between said WID and said proxy, a site key for encrypting said service database and decrypting said password for said WID stored encrypted in said service database, a communications key algorithm using both said identifier for said WID and said password for said WID, for the purpose of generating a communications key, a first message for the purpose of said WID requesting a connection to said proxy, said first message comprising two parts, one part including said identifier for said WID encrypted with said secret key, and a second part including an encoded command and parameters for said command, said second part encrypted with said communications key, a session key for encrypting messages after a session is established, at least one token for validating messages within a session, and a second message for the purpose of said proxy providing to said WID said token and said session key, said second message encrypted with said communications key, whereupon the receipt of said token and said session key said WID is enabled to provide at least one further message to said proxy by returning said token within said message to said proxy.

According to another aspect of the invention, there is provided a system further comprising: an identifier for said at least one user of said WID, stored unencrypted in said service database, a password for said at least one user of said WID, stored as a hash value in said service database, a hash value resulting from hashing said identifier for said user with said password for said user, said hash value for substituting in place of said password for said user, and a third message for the purpose of securely authenticating and authoring said user.

Proxy Processing

The method and system aspects of the present invention use and include a true proxy server ("proxy") element intermediate the WID and the managed entity, advantageously thereby minimizing the processing burden on the WID and the managed entity.

By running substantially the entire administration service on the proxy (typically behind a firewall), rather than on any managed entity, even when a managed entity is "off line" the method of the present invention experiences a high probability of being both available and useful, since the proxy can deliver low-level commands to the operating system of the subject managed entity forcing it to reboot or shutdown if other commands would not be effective in restoring operation. Further, by implementing a true proxy method of providing administrative services, not only is there a single point of entry through the firewall to the LAN, but the proxy may pre-process every message before it reaches any managed entity on the LAN, thereby off-loading the burden of message processing from the WID and the managed entities to a potentially more powerful machine dedicated to authentication, interpretation, authorization, and queuing all traffic created or requested by WIDs.

Advantageously, the system aspect of the present invention further implements a GUI to an embedded client application that may be used to deliver WMI, ADSI, Win32, Telnet, SSH and other commands through a common and familiar interface accessible to a wider range of users including less skilled operators in the event that a preferred network administrator is not available in a timely manner. The system of the present invention is capable of (without the industry standard cryptic SSH Command Line interface considered unfriendly to legitimate but less-skilled operators) performing operations that an SSH based system could perform—but does so through an easier to use (i.e., less prone to error) interface that also accesses operations an SSH system cannot. Even where commands are (to reduce the keystrokes on the WID) grouped or batched, the macros or other means for such grouping are interpreted on the proxy rather than stored on the managed entity.

Advantageously, as compared to SSH-based technology, the system aspect of the present invention requires no services (unless TELNET or SSH is desired) to be run on the managed entities and unlike a router processes, screens and otherwise handles all network administration traffic before it is delivered to the managed entities.

Delivery of Secure Telnet Services Behind a Firewall

Advantageously, the system aspect of the present invention further makes it possible for Telnet Services to be delivered securely from a wireless device and across the Internet to or from a managed entity behind a firewall by using the proxy technology described herein. Given that the WID is never connected directly to the subject managed entity, advantageously, among the functionality that the WID can request that the proxy provide on its behalf, is a Telnet/SSH connection. If the Telnet/SSH service is already running on the managed entity, since the LAN related user ID and user password are already stored on the proxy (i.e., do not have to be transmitted) they may be supplied to the managed entity and any Telnet/SSH commands mapped to the novel messaging protocol described in detail above will be encoded at the WID for decoding at the proxy and then sent to the managed entity after being authorized in exactly the same manner as all other commands are handled according to the method and system of the present invention. In a particular installation only a subset of Telnet/SSH commands may be mapped to the messaging protocol of the present invention, or the proxy may be used during authorization to restrict access to particular Telnet/SSH commands to particular users respecting particular managed entities.

Advantageously, the apparatus aspect of the present invention in the soft agents for use on each of the wireless input device and proxy server ends of the communication process are provided to the user through a menu driven GUI novel to wireless network administration, as well as self-installing and easily configured. Moreover a single installation of the service of the present invention permits management of all connected managed entities, even across multiple domains. Importantly, no software agents need to be installed on any of the managed entities. The method and system of the present invention permit a full but configurable range of functionality, including: view, move, cut, copy and paste files; view and edit text files (e.g., Boot.ini, batch files, html, etc); e-mail ("send to") files from a managed entity; monitor the services and processes on any managed entity; stop, start, restart or pause services and kill bad processes; logoff, shutdown, or force-reboot any managed entity; generate and run custom scripts and batch files; control power to any external device including servers, switches, hubs, modems; and execute any command line instruction securely allowing control of any network device that supports SSH or Telnet, including: UNIX™, Linux, routers, hubs, print servers.

According to one aspect of the invention, there is provided a method, for a user to wirelessly administer at least one managed entity, comprising the steps: transmit an encoded message, including commands for said managed entity, from a wireless device, receive and decode said message on a message processor trusted by said managed entity, authenticate said device and authorize said commands on said message processor, and send authorized commands from said message processor to at least one managed entity. Further wherein said managed entity comprises a server connected to a LAN and said wireless device comprises a portable digital computing device having access to the Internet through a radio network. Further wherein said transmission of said message is via wireless or internet means or a suitable combination thereof. Further wherein said commands are adapted for execution by the operating system of said managed entity. Further wherein said message is encoded by applying a symbolic representation of groups of commands or an encryption of said representation (or both) for the purpose of making said message smaller in size or more difficult to access. Further wherein said decoding comprises: decrypting, interpreting, and expanding said message to a list of said commands suitable for transmission from said server to said managed entity. Further wherein said authentication and authorization are completed by said server acting as a proxy for at least one said managed entity. Further wherein said authentication comprises confirming that said device is a device registered on said server or said user is a user registered on said server. Further wherein said authentication comprises confirming that said device is a device registered on said server and said user is a user registered on said server. Further wherein said authorization comprises confirming that said user is permitted to require said managed entity to execute said commands. Further wherein said transmission of said authenticated and authorized commands from said server to said managed entity is completed without any connection between said device and said managed entity.

According to a further aspect of the invention, there is provided a system, for a user to wirelessly administer at least one managed entity, comprising: means for creating and transmitting an encoded message, including commands for said managed entity, from a wireless device to the internet, means for receiving said message, a message processor, trusted by said managed entity, on which to receive and decode said message, means for authenticating said device and authorizing said commands on said message processor, and means for sending authorized commands from said message processor to at least one managed entity. Further wherein said means for creating and transmitting an encoded message from a wireless device, comprises a first soft agent operating on a radio network enabled transmitting device, including a cell phone or a pager, further having means of access to the internet. Further wherein said means for receiving said message comprises a connection to the internet adapted for use by said message processor. Further wherein said message processor comprises any server, not having Port 80 open, but adapted for connection to the internet as well as to the network on which said managed entity operates, and for which suitable access rights have been granted. Further wherein said means for authenticating said device and authorizing said commands on said message processor comprises a second soft agent operating on said message processor. Further wherein said means for sending authorized commands from said message processor to at least one managed entity comprises a connection to said LAN.

The accompanying drawings, which are incorporated in and constitute a part of this specification, illustrate preferred embodiments of the method, system, and apparatus according to the invention and, together with the description, serve to explain the principles of the invention.

BRIEF DESCRIPTION OF THE DRAWINGS

The present invention, in order to be easily understood and practiced, is set out in the following non-limiting examples shown in the accompanying drawings, in which:

FIG. 8 is an illustration of an embodiment of the protocol of the present invention.

FIG. 9 is an illustration of an example of a portion of the security system the present invention.

DETAILED DESCRIPTION OF THE PREFERRED EMBODIMENT

Reference is to be had to FIGS. 3-8, in which identical reference numbers identify similar components.

Proxy Processing

Figure 1:
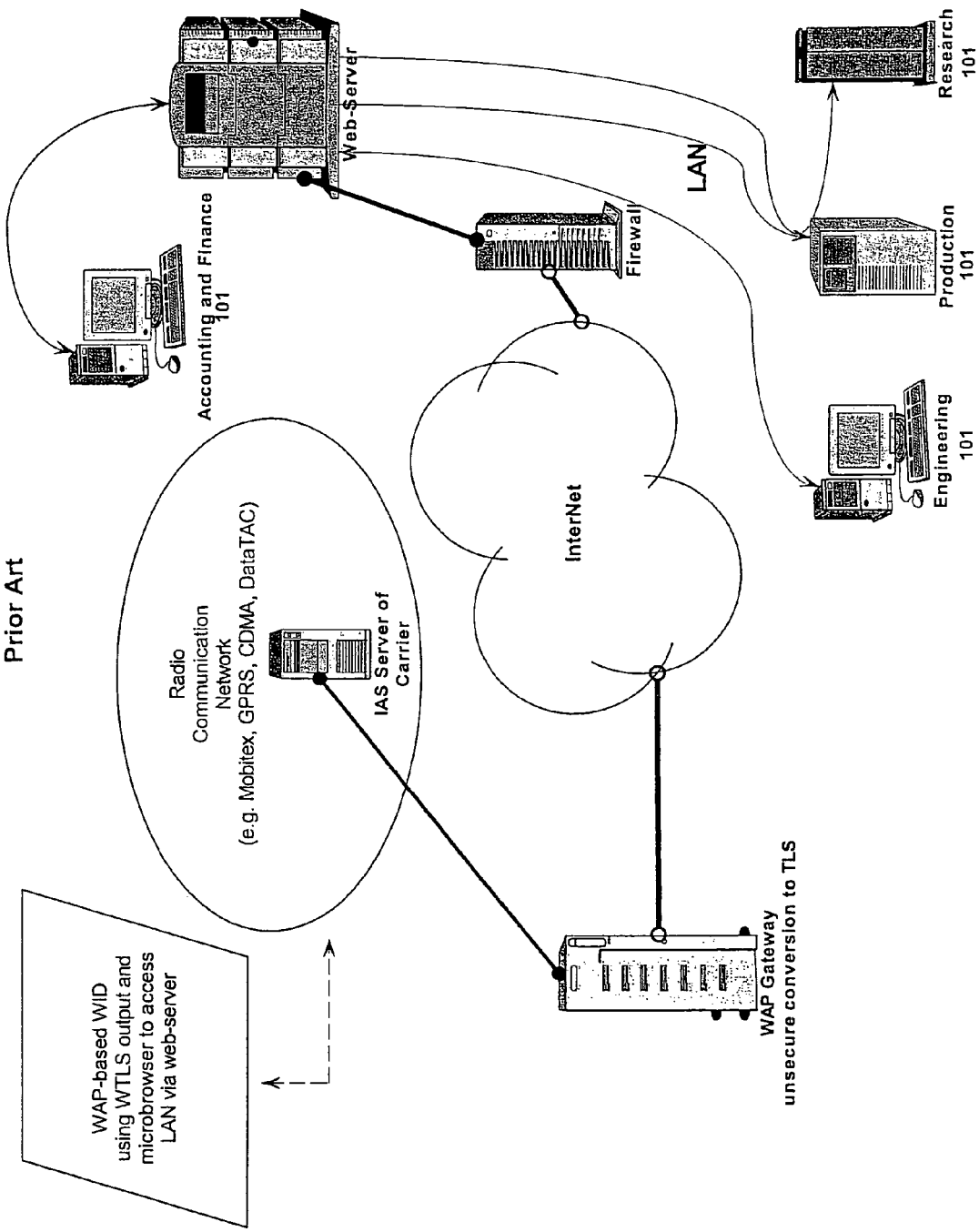
FIG. 1 is an illustration of prior art based on a web-server.
Figure 2:
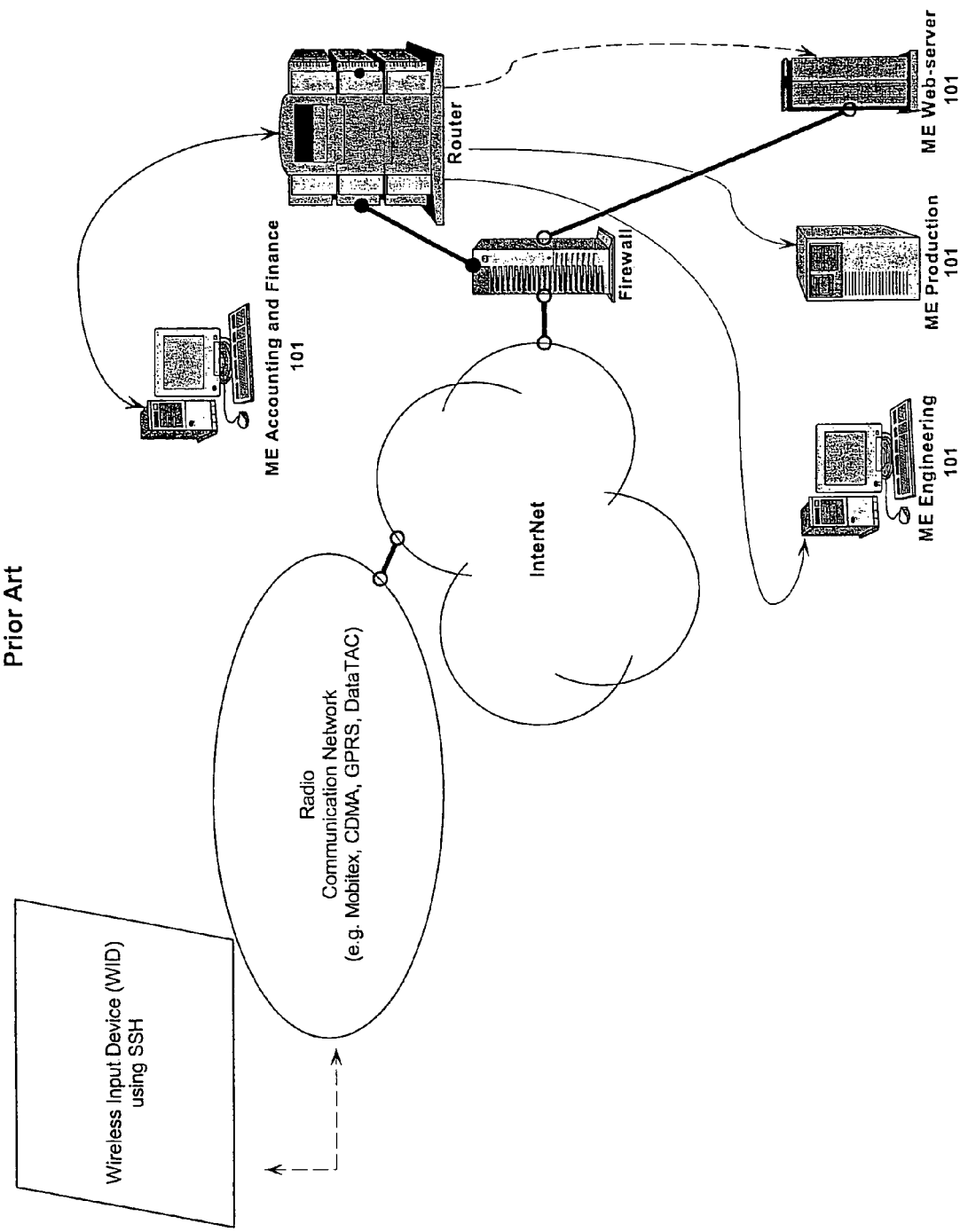
FIG. 2 is an illustration of prior art based on a router or gateway.
Figure 3:
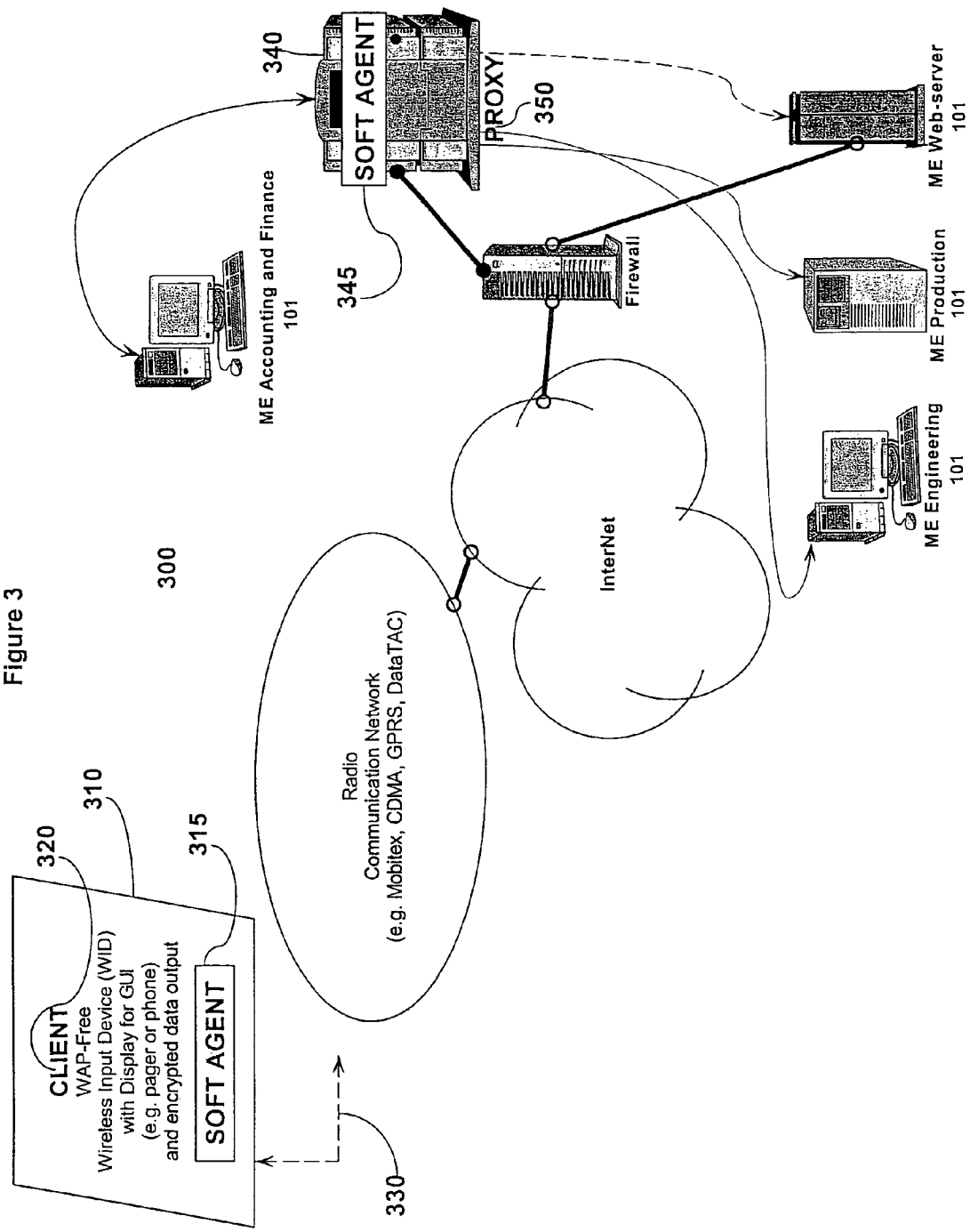
FIG. 3 is an illustration of one embodiment of the system of the present invention.

Referring to FIG. 3, there is illustrated an embodiment of the system of the invention including novel elements 315 and 345 operating on and in cooperation with several known elements. The system denoted generally as 300 comprises client 320 being any suitable wireless input device (WID) 310 having loaded thereon (client application) soft agent 315 that is configured to accept input and assemble messages according to a particular messaging protocol and security model (each set out in greater detail below). Agent 315 further executes all appropriate processing necessary to transmit via radio wave 330 through a conventional radio network an encoded message running over TCP/IP across the Internet, which processing depends on the particular WID hardware and signal carriers being used. Advantageously, Agent 315 eliminates the need to use a generic micro-browser (e.g., Internet Explorer, or Netscape), which would create a security risk. Further, since Agent 315 does not use WAP, no use of WTLS, a WAP gateway, or conversion to TLS are required for transfer over the Internet. Typically, server hardware 340 is located "behind" suitable firewall technology in order to limit the number of physical ports connected to the Internet. Soft Agent 345 running on server 340 together comprise the "message processor" being proxy 350 that receives, decrypts and decodes messages assembled and transmitted by client 320.

According to a preferred embodiment, proxy 350 is (at least logically) distinct from any web-server that may be associated with the site at which the service has been installed. Although proxy 350 may manage a web-server as one of its managed entities 101, according to the present invention such a web-server is always isolated from the LAN of entities being managed by client 320 and proxy 350. A person of skill in the art would understand that Port 80 will not be used by hardware 340 (to access the internet) on which soft agent 345 runs to operate as proxy 350. Hardware 340 will require access to the internet through an unknown port that is not "open" per se.

It is contemplated that the system of the present invention can manage a plurality of managed entity 101, on separate domains or on isolated LANS. Further, proxy 350 can decrypt and decode messages from a plurality of clients 320 each of which may transmit messages that may contain a plurality of commands defined by a particular messaging protocol, upon receipt of which proxy 350 can transmit authorized commands from authenticated clients 320 to one or more managed entity 101.

Figure 5:
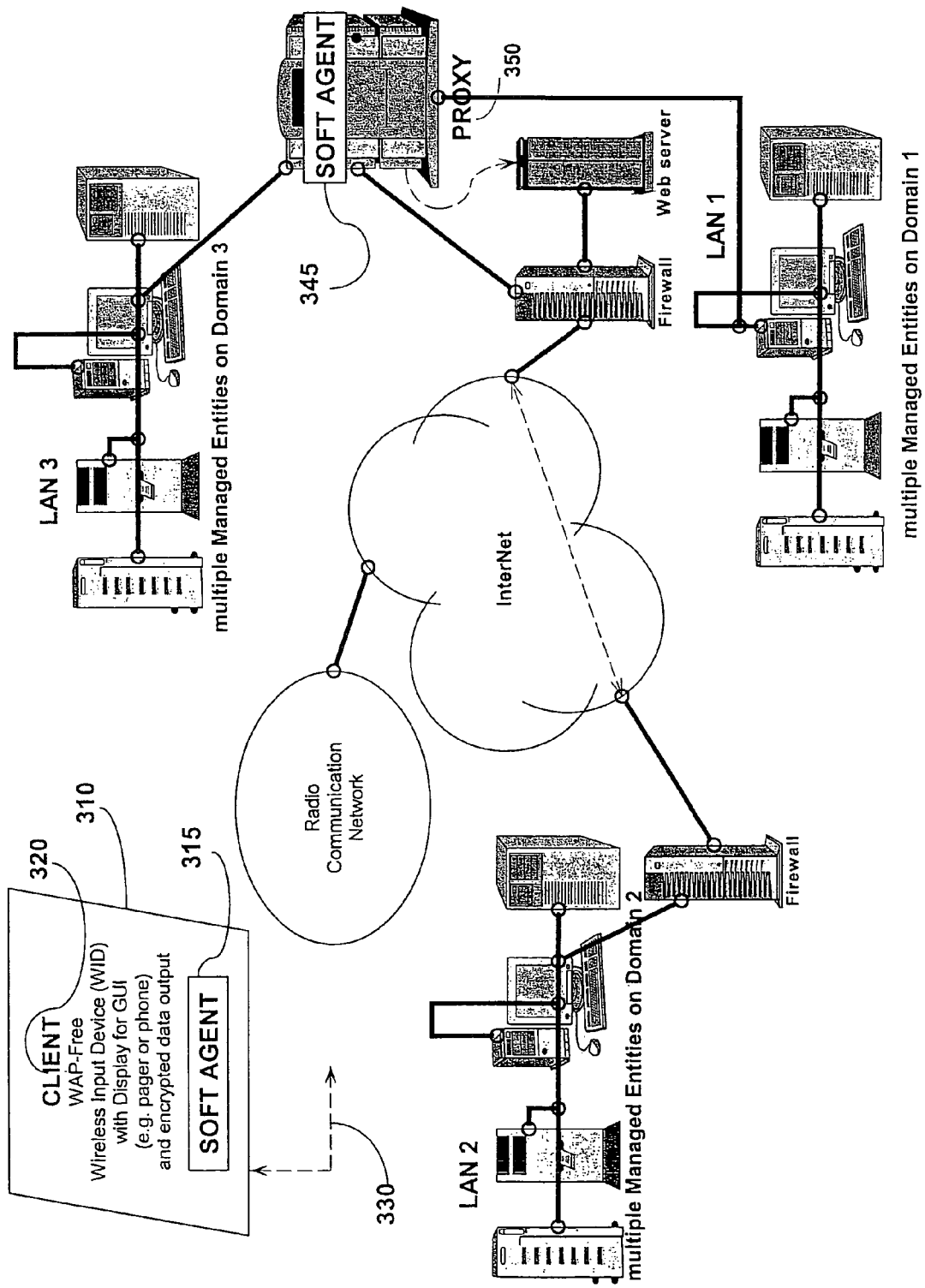
FIG. 5 is an illustration of an alternate embodiment of the system of the present invention.

Referring to FIG. 5, proxy 350 may be installed as a stand-alone device, or it may be included in a domain (e.g., domain 1 or domain 3), but in either configuration proxy 350 may be used by a plurality of client 320 to manage a plurality of managed entity 101 on any of the domains or LANs using identifiers that are unique to the service or are used within the subject domain or LAN.

Figure 4A:
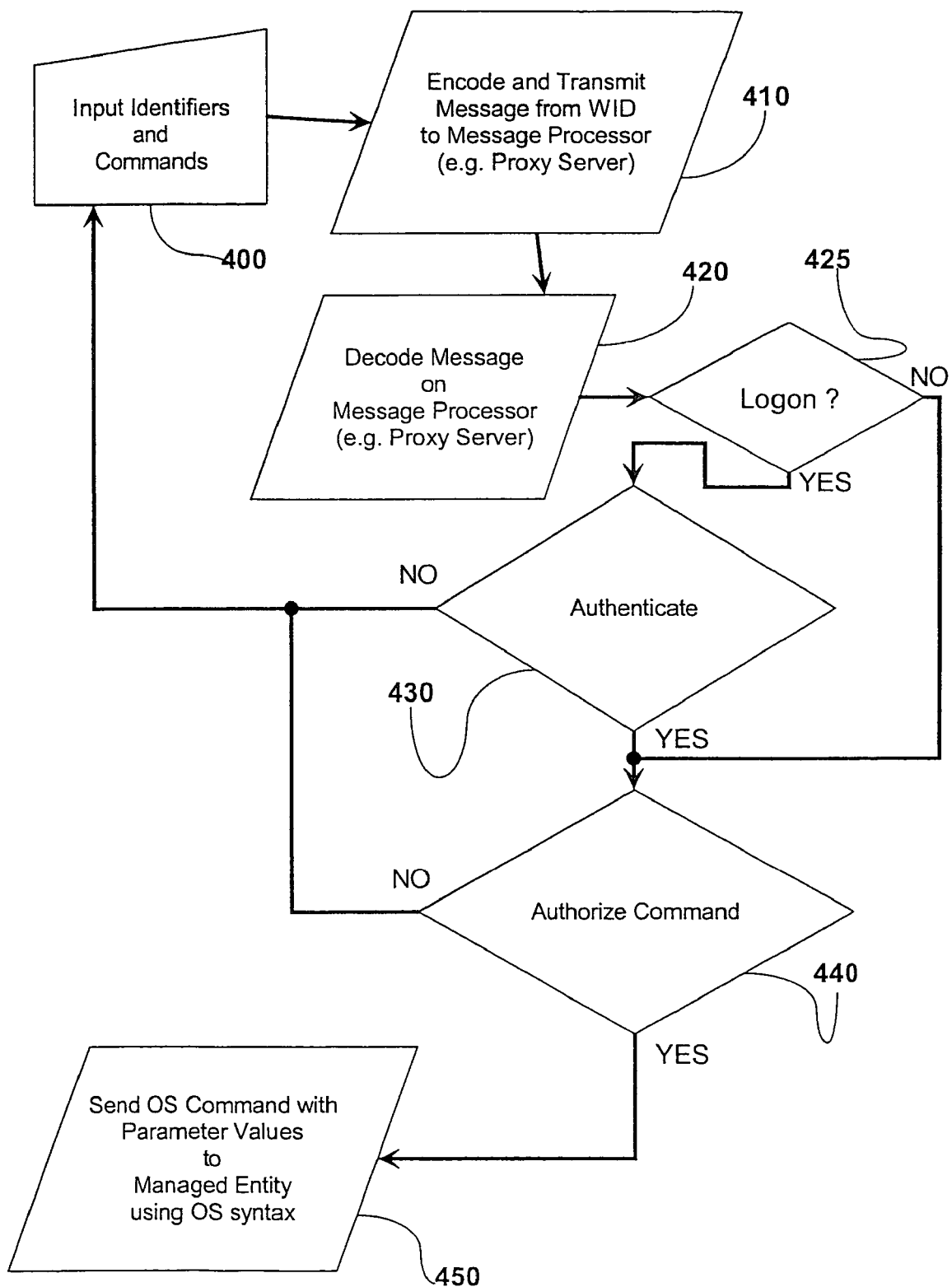
FIG. 4a is an illustration of one embodiment of the method of the present invention.
Figure 4B:
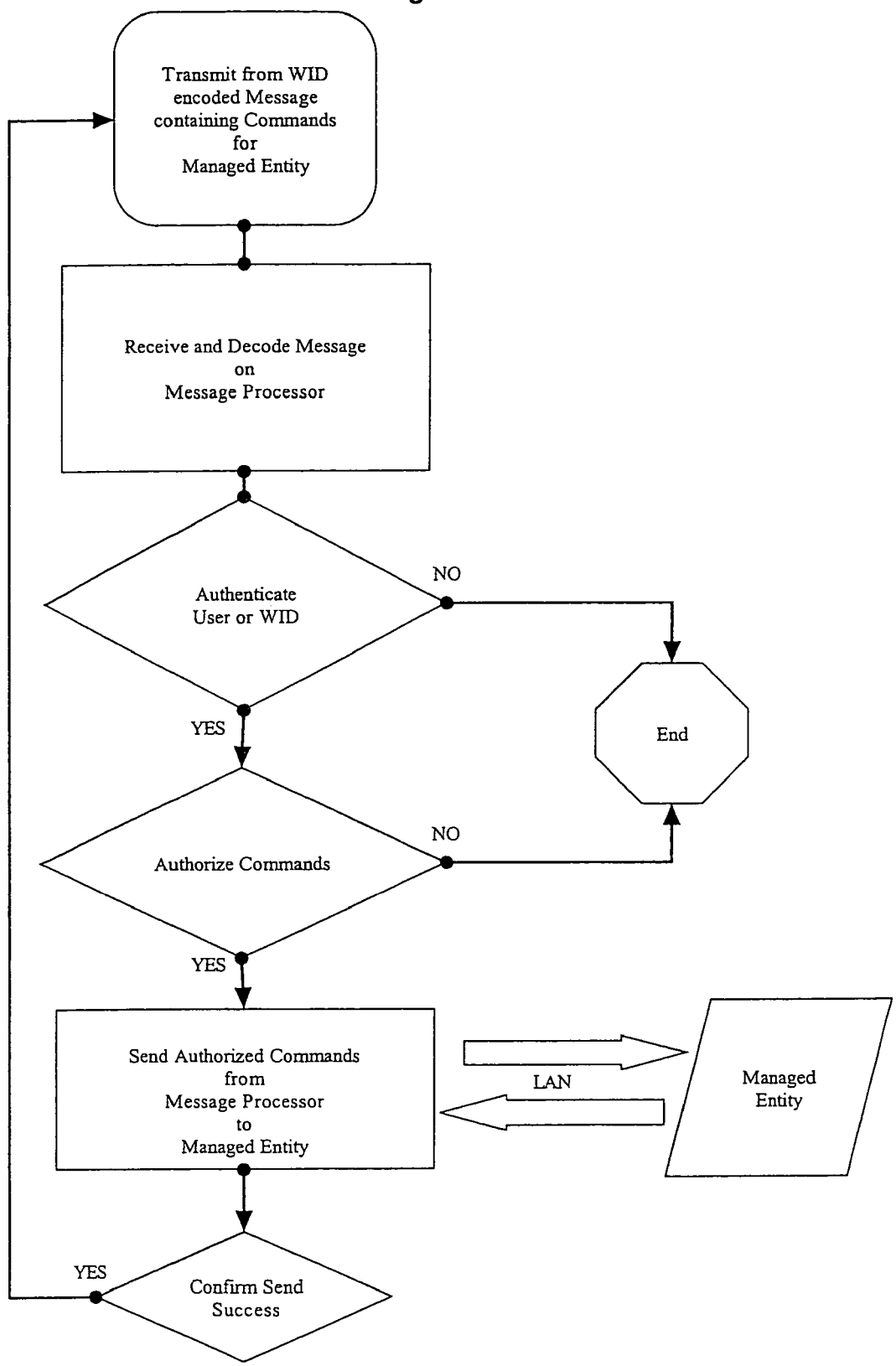
FIG. 4b is an illustration of an alternate embodiment of the method of the present invention.

Referring to FIG. 4a, there is illustrated an embodiment of the method of the invention according to which an Administrator at step 400 uses a WID to input information such as an identifier (e.g., user name) and a command (e.g., logon). A person of skill in the art would understand that after the logon is complete and a session established, tokens may be used to eliminate the need for Identifiers. At step 410 the WID, according to pre-defined algorithms (whether generic or proprietary), assembles the input and encodes the resulting message for security and transmission. According to a preferred embodiment of the present invention, the encoding will avoid the use of any generic rules or protocols by applying both a message protocol and a security model that together decrease the number of bits that the WID must handle and transmit, at the same time as decreasing the risk that a cracker will be able to discover anything of value from an intercepted message. At the Network, Data Link and Physical layers, the appropriate further processing necessary to transmit the encoded message using TCP/IP through a conventional radio network and across the Internet will depend on the particular WID hardware and carriers being used.

At step 420 upon reaching the service destination, a true proxy server (any suitable "message processor" that is not also configured to operate as a web-server) receives the message for processing before any commands are delivered to the managed entities. Processing involves decoding the message with the appropriate keys (as set out below), which depend on whether the subject session is being opened or is already in progress. For example, if the command input at step 400 is "Logon", then the proxy will use a first key (also known as a secret key) to decrypt the message header containing an Identifier (e.g., the WID ID), which information may be used to select a second key (also known as a communications key) to decrypt the rest of the message (i.e., the portion after the header) from which the code for the logon command may be recovered. If the logon command is present, then at step 425 the proxy will proceed to authenticate 430, however, if the command is not Logon, then according to a preferred embodiment at step 425 the proxy may proceed to authorize 440 the command as set out below, since, unless the WID or the user (or both) has previously been authenticated, no token will have been provided for the proxy to validate the requested command such that authorization 440 will fail.

While authentication 430 may be carried out for any or every message, according to a preferred embodiment the WID is authenticated implicitly by the proxy using the correct communications key based on the WID ID it was able to decrypt using the secret key. In other words if the WID is the device that the ID indicates it is, then it will be able to decrypt the next message that it receives from the proxy, which next message will be encrypted using the communications key that matches the WID ID, and which next message includes a session key generated by the proxy for use completing all transactions in the session just created.

In the same authentication 430 step or in a separate step (and message code) user information may also be provided for the purpose of the authorization 440 of the commands submitted at input 400. In the present example, once authentication 430 is completed, user identifiers may be referenced to determine whether or not the user is permitted to execute the subject command. Typically, any valid user would be permitted to complete a logon command to establish a connection for the WID permitting a session to commence, upon which a logon user command may be completed under the protection of a third key (also known as a session key) and maintaining transaction validity by passing tokens (as set out below) between the proxy and the WID. At authorization 440 the proxy compares the command submitted with a listing of permissions associated with the user authenticated or otherwise identified. If the user is authorized to execute the subject command(s), then the proxy may transmit 450 the command(s) to the managed entities for immediate execution (or with user identifiers for further authorization) since, according to a preferred embodiment, the proxy is trusted by the managed entity. If the user is not authorized, then any appropriate alternate action may be taken by the proxy (e.g., terminate, provide error message, request resend, et cetera) without interfering with the operation of the managed entity or adding any burden to the LAN.

Messaging Protocol

The convenience and flexible sharing of data that results from using standard or generic protocols comes at the expense of security, which trade-off is not acceptable in some applications such as network administration. Consequently, it is advantageous to apply a set of communication rules or a protocol not generally available to the public by encoding a message using a symbolic representation of commands or groups of commands—"mapping" those commands to a set of symbols that are shared (with the resulting "maps") between the communicating parties. The symbols may be any character or group of characters the number and complexity of which will be determined in part by the number of commands to be encoded by the subject protocol. In addition to applying a layer of security beyond any encryption also applied, such a protocol may like "shorthand" notation result in the ability to convey a greater quantity of information with fewer characters.

Referring to FIG. 8, there is illustrated an embodiment of the protocol of the present invention comprising: a 4-digit numeric code 255, mapped to and representing at least one command 256 (for an OS), together with an alphabetic character R 265 (for Requests) or A 266 (for Answers), each numeric code 255 having an associated set of parameters 275 (for Requests) and 276 (for Answers) the number and nature of which parameters depends on the particular operating system command(s) 256 to which the numeric code 255 has been mapped. And, each said parameter 275 or 276 having at least one associated value 285 or 286 (a default value or a set of possible values) the type and quantum of which values depends on the particular network and managed entity (not shown) for which the message (not shown) including the number-character combination 295 or 296 has been created. It is understood that in applying the protocol only the values of the parameters are ever transmitted with the codes, since the soft agents have the means (e.g., via the sequence and delimiting characters) to determine which parameters each value applies to.

Once the mapping of required operating system commands (256 in the example) to, numeric codes (255 in the example) has been completed, a message may be assembled by selecting an appropriate character (265 R being for a, Request in the example) to append and then including the code resulting from that number-character combination (295 in the example) in any suitable position within the message corresponding to a pre-defined sequence expected by the intended recipient. Similarly, once the pre-defined sequence has been shared between the communicating entities, in a preferred embodiment a proxy server is used to receive the message for decoding and screening prior to sending to the managed entity only those elements of the message that are required, in any format or sequence preferred by the managed entity, which sequence a person of skill in the art would understand may be entirely different than that adopted for the original coding and transmission from an input device to the proxy. According to an alternate embodiment, although the sequence must be defined, delimiting characters may be included in the message to facilitate reliable interpretation when the message is (typically by parsing out) broken down by any suitable message processor whether loaded on a true proxy device or not.

According to one embodiment of the protocol of the present invention adapted for Microsoft Windows, the operating system commands 256 comprise a subset of standard ADSI commands that are commonly required for network administrative functions, to manage a variety of computing devices (i.e., managed entities). However, since managed entities running different versions of Microsoft Windows® also require control that is not (well or at all) implemented (i.e., no library scripts available that work) in the ADSI programming interface, a subset of the WMI and the low-level WIN32 interface commands are also mapped to numeric codes (255 in the example) used to communicate with the operating system of the subject managed entity.

According to another embodiment of the protocol of the present invention, the standard ACK reply available for receipt of packets is used in a novel manner in wireless communication as a "handshake" that addresses the problem of "dropped packets" without flooding the network with unsolicited resends. For example, if a user requests information from a managed entity just before losing wireless coverage, the proxy may only have time to send one packet of the message to the WID. Until the proxy receives an ACK response from the WID confirming receipt of that first packet, no further packets will be sent to that WID, but if wireless coverage is restored within a configurable time period, then the WID can request a resend of the dropped packet. After a configurable time (e.g., ten minutes) the proxy may proceed to terminate the session if an ACK has not been received from the WID. Advantageously, in addition to avoiding network overload, by not repeatedly resending dropped packets, there are fewer opportunities for such packets to be intercepted. Similarly, if the user requests a large amount of data from a managed entity, then the proxy will break or "chunk" the data into smaller blocks each of which is terminated with EOB (End Of Block) informing the WID to expect more information after the proxy receives an ACK respecting the block just delivered. If after sending that ACK to the proxy, the WID does not receive more information, then the WID can request the next block, which from the proxy's perspective may be a resend. To indicate to the WID that a transaction is complete the proxy terminates the packet comprising the last block with EOT (End Of Transaction).

Referring to FIG. 9, there is illustrated an embodiment of the protocol of the present invention represented in use in the practical example of a WID requesting a connection to a proxy.

Security

Figure 6:
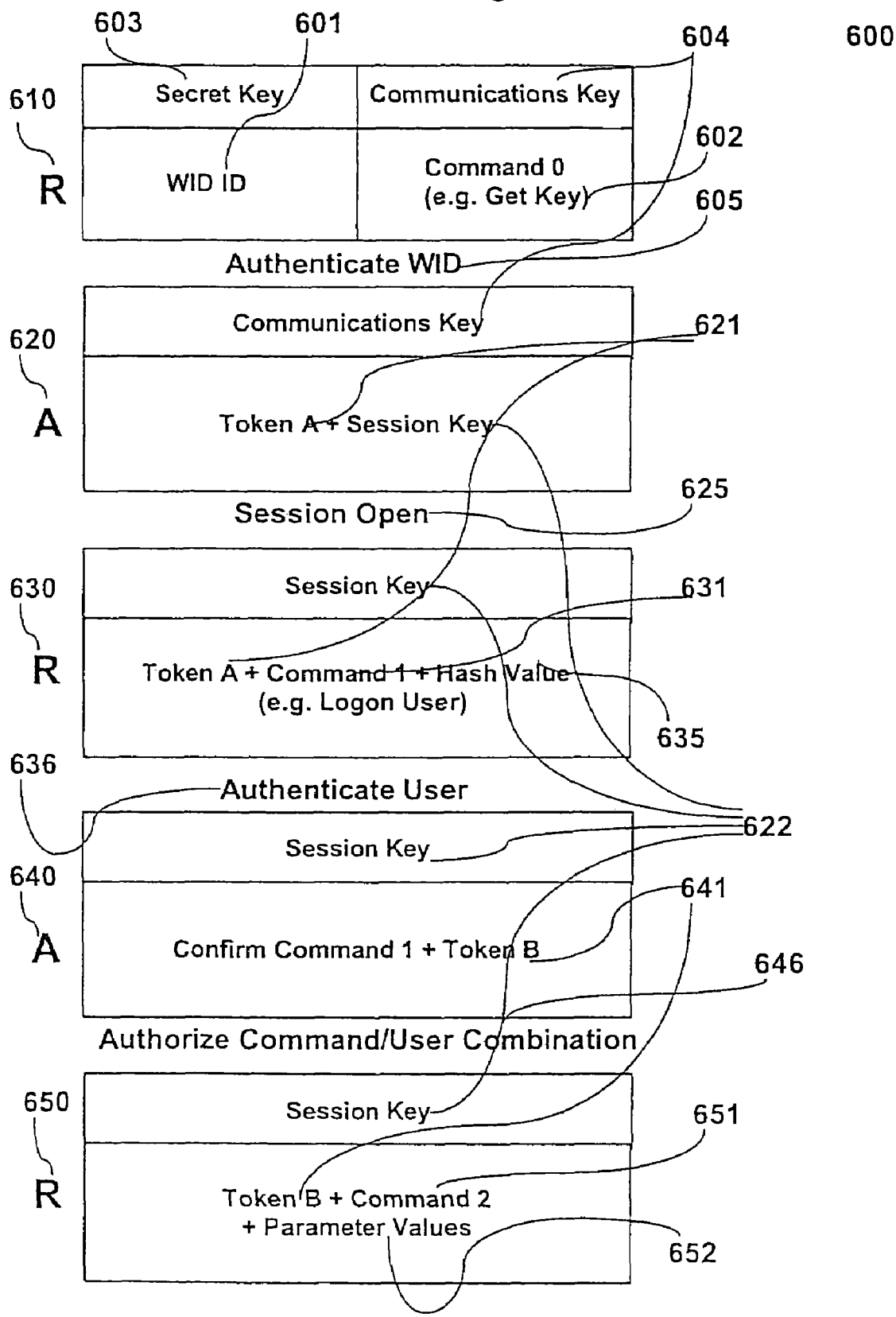
FIG. 6 is an illustration in logical and temporal form of an embodiment of the security system of the present invention for securing communication between a WID and a proxy.

Referring to FIG. 6, there is illustrated in logical and temporal form an embodiment of the security system of the present invention for securing communication between a WID and a proxy having access to an encrypted service database for storing information respecting said WID and information respecting at least one user of said WID, wherein, by way of example, a series of messages (one or more packets each) denoted generally as 600 is shown.

A first message being Request 610 from a WID (not shown) to a proxy (not shown) has within one portion of said packet an identifier WID ID 601 encrypted using a secret key 603, and within a second portion of said packet delimited by any suitable means an initializing command 602 encrypted using a communications key 604. The identifier WID ID 601 may be any suitable symbol unique to that device, for example the serial number of a chip inside the device, or a unique name provided to that device by the Administrator of the subject service. Similarly, while the command 602 may in theory be any command, practically speaking one of a subset of initializing commands is required to establish a connection between the WID and the proxy—in the present example the command "Get Key" is a request for a session key.

Once Request 610 has been received and processed by the proxy, WID Authentication 605 is complete since the proxy uses secret key 603 to decrypt WID ID 601, which the proxy then uses to lookup the WID password from the encrypted service database on the proxy (since the WID password or pass-phrase is never transmitted) for the purpose of running the communications key algorithm in order to generate the communications key to decrypt the second portion of the packet containing command 602 encrypted with communications key 604. Since the WID ID 601 and the WID password (not shown) are the seeds on which the communications key algorithm runs, unless the WID password originally registered in the encrypted service database on the proxy is the same as the password used by the WID to generate the communications key used to encrypt command 602 the proxy will not be able to decrypt command 602 and Request 610 will be denied such that the session may terminate. In the present embodiment WID Authentication 605 is advantageously implicit in the ability to decrypt command 602 such that no further express authentication step or process is required.

Since none of: the WID password, the communications key algorithm, nor the communications key itself are ever transmitted they cannot be intercepted, such that even if the secret key were compromised and the WID ID discovered from an intercepted packet, there would be insufficient elements available to a cracker to reveal the contents of the second portion of Request 610.

It is contemplated that packet size may be reduced sufficiently or transaction content increased sufficiently that request 610 may comprise more than one packet, each intermediate packet having an EOB (End of Block) termination that would alert the proxy to expect further packets until the final packet is received having an EOT (End of Transmission or Transaction) after which the message may be assembled for decryption and decoding.

A second message being Answer 620 from the proxy is encrypted with communications key 604 (that the proxy generated in order to reveal command 602) enclosing Token A 621 together with (one time) session key 622 for the purpose of enabling the now authenticated WID to complete additional transactions that are permitted at this stage. Once the WID has received and decrypted Answer 620 using communications key 604, it will have the use of Token A 621 and session key 622 such that a session open 625 status is reached permitting all further transactions to be encrypted using the unique session key 622 generated by the proxy for this WID and this session.

A user may then create a third message Request 630 that returns Token A 621 with a command 631 suitable to the permissions the WID has been granted as a result of WID Authentication 605. Practically, and for the purposes of this example, command 631 is a Logon user command that is accompanied by at least the user ID and Hash Value 635 as parameters. User ID and Hash Value 635 are used by the proxy to Authenticate user 636. Although according to a preferred embodiment, when the user enters his or her user ID and user password on the WID a Hash Value 635 results from one-way hashing the user ID with the user password to create a strong substitute for the typically mnemonic password, it is contemplated that weaker forms of user authentication may be deployed within this system successfully. Hash Value 635 is created at the time the WID is initialized in the system, upon which Hash Value 635 is stored in the encrypted service database on the proxy in place of the user password that is never stored and for security reasons is intentionally not recoverable from the one-way hash function. Request 630 is encrypted with Session Key 622 prior to transmission from the WID.

A fourth message being Answer 640 from the proxy is encrypted with Session Key 622 prior to transmission from the proxy that first confirms that the subject user is authorized to access the proxy but having allowed the user to Logon, must await the next command before it can authorize that user to complete a transaction respecting a particular command at 646 for which purpose Answer 640 has included Token B 641.

A user may then create a fifth message Request 650 returning Token B 641 with a command 0.651 and required Values 652 for the parameters appropriate to the particular command 651. At this point the user may submit any command 651 that the proxy will be able to determine from its user permissions listing that the particular user is authorized to execute in relation to each managed entity (not shown) that the subject user is authorized to access.

According to a preferred embodiment, advantageously, the proxy maintains all of the LAN-related user ID and user password information as well as a complete listing of all of the permission settings granting or denying each user the right to access each managed entity on each domain administrated using the proxy, as well as the permission settings granting or denying each user the right execute each implemented command 651 on each managed entity.

Upon successfully transmitting message Request 650 the above-suggested sequence of Answer and Request continues with each session transaction being completed using one or more packets the number of which packets depends on the particular command code and parameters being submitted with the Request by the WID, or the amount of data being returned with the Answer by the proxy. As set out elsewhere herein, such data "chunking" is implemented for efficiency reasons to complete wireless exchanges and together with the novel requirement for an ACK reply to each packet (primarily to avoid flooding) containing a chunk also has the security advantage of reducing both the likelihood and amount of data intercepted.

Figure 7:
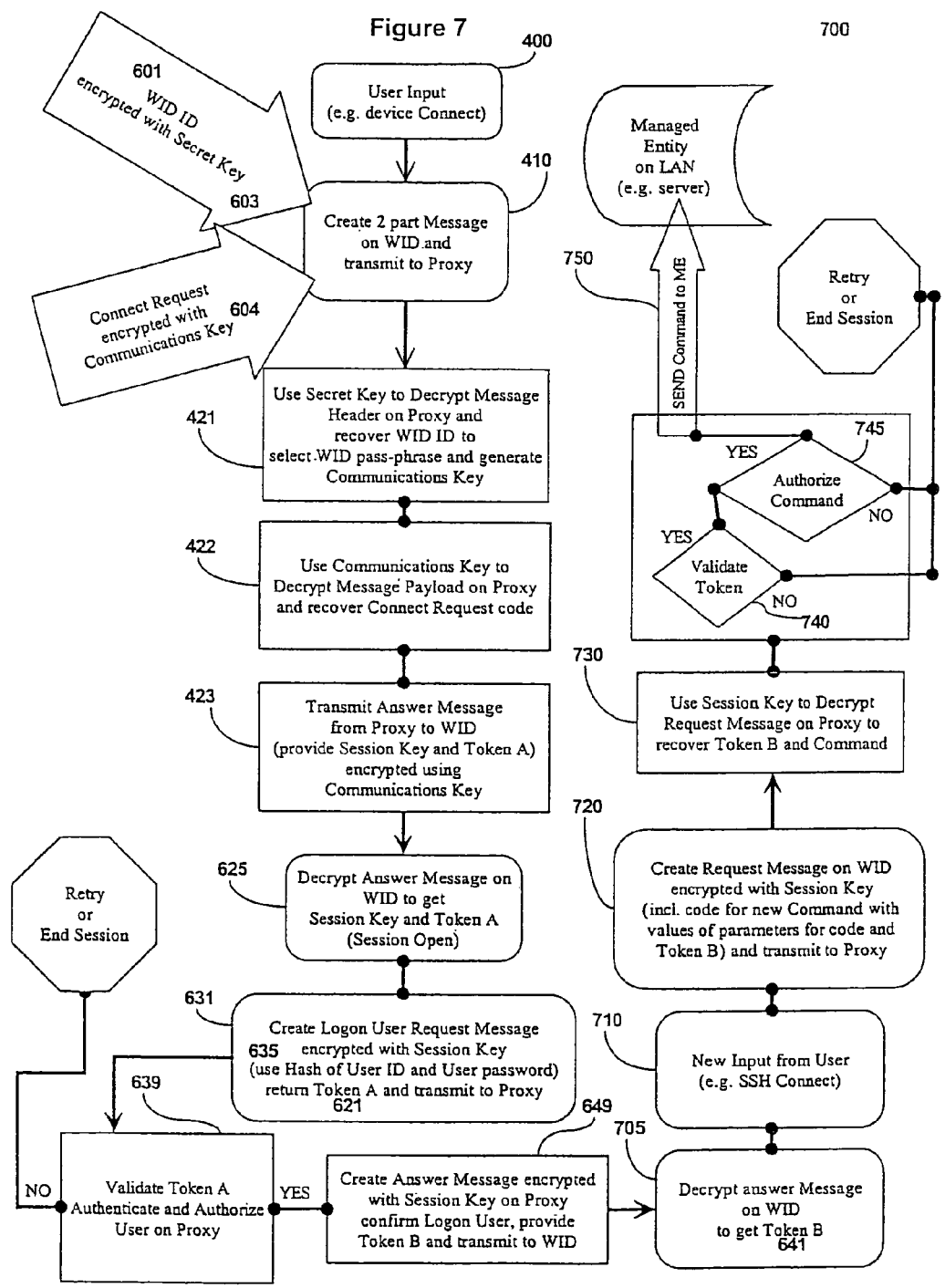
FIG. 7 is an illustration of an alternate embodiment of the security method of the present invention.

Referring to FIG. 7, there is illustrated an embodiment of the method of the present invention for securing communication between a WID (not shown) and a proxy (not shown) having access to an encrypted service database (not shown) for storing information respecting a plurality of WIDs as well as information respecting a plurality of authorized users. According to a preferred embodiment, for security reasons, user Input 400 is required to cause the WID to initiate a connection to the proxy. A WID ID 601 or other suitable identifier for said WID, stored encrypted on the WID and stored unencrypted in the service database, is required to create two-part message 410. WID ID 601 is decrypted using secret key 603 that has been pre-shared between the WID and the proxy. A password or pass-phrase (not shown) for the WID that is stored encrypted on the WID as well as in the service database is not expressly required to create message 410, but said WID password is used with a communications key algorithm and WID ID 601 for the purpose of generating communications key 604 that is used to encrypt one part (commonly referred to as the message payload) of message 410.

In the present example two-part message 410 is transmitted for the purpose of said WID requesting a connection to said proxy. One part (commonly referred to as the message header) includes the identifier for the WID encrypted with secret key 603. The second part (commonly referred to as the message payload) includes an encoded command and parameters for that command. The second part is encrypted with communications key 604. According to one embodiment, the header may be delivered preceding the payload. However by using symbols to delimit the header the message packets may be arranged and delivered in any sequence since the proxy will be able to distinguish the two parts thereby for interpretation. At step 421 the proxy decrypts the header to obtain the WID ID, which it uses to select the WID pass-phrase stored in the service database, which pass-phrase it uses to generate communications key 604 on the proxy, for use in step 422 decrypting and decoding the payload to determine that the WID has sent the R9000 Get Key command that has previously been mapped to a series of instructions intended to result in the WID establishing a connection with the proxy for the purpose of conduction a session of transactions to execute commands not yet specified. A person of skill in the art will recognize that any suitable means for storing and using the "map" of commands permitting the proxy to "expand" from the encoded R9000 to the LAN or managed entity related commands or instruction sets may be adapted for use with the method of the present invention.

By transmission step 423 the WID authentication (implicit in reading the payload) is complete and the proxy has (by any suitable means) generated session key 622 for encrypting all transactions during the session about to be established. Further, Token A 621 is generated (by any suitable means) and will be included with session key 622 in Answer 620 encrypted using communications key 604 for transmission to the WID. At step 625 the WID uses its copy of communications key 604 to decrypt the message and obtain session key 622 for use throughout the rest of the session now established, as well as obtaining Token A 621 for use in validating the next message that it transmits to the proxy for a first session transaction. As set out earlier in FIG. 6 the next message transmitted by the WID is typically a Logon user command using Hash Value 635 together with Token A 621, which sequence is executed on the proxy in the present example at step 639 validating Token A 621 (to confirm that the command is not being replayed) as well as authenticating and authorizing the user for access to the proxy from which that user will be permitted to instruct the proxy to have particular (listed) managed entities execute particular (listed) commands respecting which that user has network privileges. At step 649 the proxy provides Token B 641 to the WID, obtained at step 705, for the purpose of validating the next message through which the user of the WID at step 710 provides additional input through the graphical user interface ("GUI") of soft agent 315 selecting at least one command relating to at least one managed entity on at least one domain, which command or commands are then processed at step 720 by soft agent 315 to create a Request message, in a preferred embodiment encoded in accordance with the novel messaging protocol set out in greater detail above. Regardless of how simple or complex the contents of said message transmitted, at step 730 the proxy uses session key 622 to decrypt the message, as well as using Token B 641 to validate the message 740 and avoid replay, as well as using its "maps" to decode the command and parameters provided into one or more "LAN commands" to one or more managed entities on one or more domains—upon which the proxy can at step 745 authorize each command to the instructing user, and if the particular user is authorized to execute the subject command on the subject managed entity, then the proxy will send the command across the LAN or other network to the managed entity for execution. A person of skill in the art would understand that the failure to authorize may result in a number of alternate responses, examples of which include querying the user to retry or ending the session by terminating the connection. Typically, the nature of the unauthorized command and the security sensitivity of the subject managed entity would be factors taken into account in determining which alternate responses are applicable. Further, it is contemplated that the proxy will have the ability to create and maintain logs tracking which user submitted which commands for which managed entities enabling system administrators to detect patterns of misconduct or system malfunctions.

Secret Key 603 is fixed by compilation into the embedded client software being soft agent 315 installed on the WID and the service software soft agent 345 installed to form the proxy, this Secret Key is never transmitted and is known only to the WIDs and the proxy (of a particular version of the service software), in order that the device ID of each WID need never be transmitted "in the open". The device pass-phrase is never transmitted at all, but is used to generate communications key 604.

The WID ID and WID pass-phrase together with sensitive information such as LAN Administrator ID's and Passwords are stored on the proxy in a database encrypted with a Site Key, that is unique to each site at which a service based on the system of the present invention is set up, and which Site Key is created at the time of the installation of the subject service. Advantageously, this ensures that even if database files are inadvertently or improperly transferred, they are of no use to the recipient.

According to one embodiment, the service database (i.e., the database used by the soft agent 345 running as a service on hardware 340 that together comprise proxy 350) may be encrypted using any suitable encryption technology available in the database application being used. Herein, "stored encrypted in the service database" means encrypted with the Site Key (not shown) and then stored in the encrypted service database, whereas "encrypted on the device" means encrypted with the Secret Key 603. According to a preferred embodiment, the WID ID is stored encrypted on the device, and stored unencrypted in the encrypted service database; the WID Pass-phrase is stored encrypted on the device, and stored encrypted in the encrypted service database; the user ID is not stored on the device, but it is stored unencrypted in the encrypted service database; the user password or pass-phrase is not stored on the device, but it is stored indirectly in the form of a hash value in the encrypted service database; the Administrator ID for each managed entity is stored encrypted in the encrypted service database, and the password or pass-phrase for each managed entity is stored encrypted in the encrypted service database.

At the time each new user is entered into the system, he or she must supply a password (typically something with mnemonic value) that is never stored or transmitted. Instead, a hashing function that depends on (and can be changed with) the version and build of the service software runs to create a hash value (hashing the user ID with the user password) that is (more abstract than and is) used (to strengthen authentication) in place of the conventional user password, the problem with which is that they are relatively easily guessed, cracked, or otherwise discovered. Advantageously, the typically mnemonically selected conventional user password is therefore neither interceptable during transmission nor recoverable from the small, encrypted database maintained on a stolen WID—yet it remains useful in creating a more complex hash value that provides substantially the same additional measure of user authentication as matching the simpler password would have. According to a preferred embodiment of the security model of the present invention, common Identifiers and Passwords are used as "seeds" to create replacement security elements that are more difficult to guess, "crack", or otherwise obtain from the interception of encrypted transmissions. For example, according to one embodiment of the present invention a password for each user is stored as a hash value in the subject service database. The hash value results from hashing the identifier for the subject user with the password for that user. The hash value is then substituted in place of the password for said user, such that the password is never stored or transmitted per se.

Further, according to a preferred embodiment five pieces of information are used by each WID: device ID (of the WID), device pass-phrase or password (of the WID), user ID, user password, and the IP address of the proxy server (not of the managed entity). The device ID and the device pass-phrase are entered on the proxy and on the WID manually when the WID is first enabled on the system of the present invention. The device ID is never transmitted in unencrypted form, and the device pass-phrase is never expressly transmitted at all. On the front end of the first message from a WID initiating communication with a proxy, there is an unencrypted header that specifies the encryption type and the version of the WID software embedded client being used—together with the encrypted device ID of the transmitting WID.

According to a preferred embodiment of the security model of the present invention, an integrity element (commonly referred to as Salt) is added to the message payload to enhance detection of tampering with the content of the payload. This integrity checking means is similar, but superior to the common Checksum means of detection, since Salt is not based on a known relationship to the size of the message. When using a Checksum, the integrity of what is received may be spoofed by the repacking of a message including a recalculation and substitution of the Checksum after altering the message.

In the Mobitex-based pager environment for example, to initiate a managed entity control session from a WID, a packet is transmitted to a gateway that strips off the Mobitex header and decrypts the message to obtain the location (IP address) of the proxy with which gateway typically sets up a session through a firewall protecting the proxy and the LAN behind it.

A detailed example based on the R9000 Get Key and R9001 Logon user commands is set out for the purposes of illustrating the application of the security method of the present invention. As a first step device authentication commences with a first message from the WID to the proxy.

Assume that the WID Generates and Transmits:
 <H>2.7ˆ3ˆ!@#$%ˆ&*ˆ(*$&@</H>*ˆ%$#@!)%$(%1+!#$%ˆ&*( )%$*$#%%#$%% ##%#EOT, which breaks down as follows:

| | |
|---|---|
| Header | <H>2.7ˆ3ˆ!@#$%ˆ&*ˆ(*$&@</H> |
| client version | 2.7 |
| encryption type | 3 |
| WID ID | !@#$%ˆ&*ˆ(*$&@ encrypted with Secret Key 603 |
| Message Payload | *%$#!)%$(%1+!#$%ˆ&*( )%$*$#%%#$%%##%#EOT |

In this example the service could decrypt:
 !@#$%ˆ&*ˆ(*$&@
to be
"kevinsRimDevice" (a.k.a. the Mobile ID), which soft agent 345 running as a "service" on a proxy server (collectively the proxy) would use to authenticate the WID and the individual using it (i.e., the user).

The access the Message Payload, the WID generates communications key 604 by applying its own ID and pass-phrase to the communication key algorithm. In this example,
 *ˆ%$#!)%$(%1+!#$%ˆ&*( )%$*$#%%#$%%##%# decrypts to the following:

R Request

9000 Get Key

0 Token 12-06-2002 Date

14:50:23 Time 2.7 Software Version

105 Software Revision Number

1 WID Type

58745875 Integrity Checking Element (ICE)

In this example, ICE is a number that matches a predetermined pattern (e.g., a random number appended to itself+1, here the random number is 5874 making the salt value 58745875). The proxy uses this relationship to verify the integrity of the message, because a cracker tampering with the message before resending it may not discover such a relationship.

The proxy could then provide its response, encrypted with the Communications Key, in which response it would supply confirmation of what it intends to do for the WID, together with a Token and a Session Key, which response may for example be:
 !$#@!%&*(&)*ˆ)SDGA#Q%#!%ˆ%*$ˆ(*% HWG@$% TVR#!% EOT which the WID would (use the Communications Key to) decrypt to:

A Answer

9000 Get Key

9175F1764A54Ec3B Token 2.7 Software Version

!%EP*)$*&!$!@%&*a((&b@%!—$$@SDHW$@!$!@$ Session Key

According to a preferred embodiment, after each proxy to WID transmission, the WID must reply (typically with an ACKEOT) in order to continue the Session. To ensure that packets arrive in the proper sequence as well as to reduce the risk created when communications have been intercepted, only one packet is released at a time and a confirmation of that transmission is required. If for any reason a properly encrypted ACKEOT is not returned to the proxy by the WID, then there will be no further communication such that the Session terminates prematurely.

Having received the Session Key, the WID may open a Session during which it would attempt to logon a user by sending a message encrypted with the Session Key at the same time as returning the valid (or "live") Token provided by the proxy for the purpose of executing the requested log on operation. The encrypted message could, for example, be:
 FaIJTH(*&ˆˆˆ%#jaAFei8jh031-84!@#$%ˆ&*( )*ˆ&%$@@!!@#$%ˆEOT, which the proxy would decrypt to:

R Request

9001 Logon user

9175F1764A54Ec3B Token (prevents Replay)

KEVINSRIMDEVICE WID ID 12-06-2002 Date

14:51:0 Time kevin user ID (enables Authorization)

1056789039281 Hashed Value of user ID and Password

The proxy can use the information in the above message to validate the message as well as to both authenticate and authorize the user. If the token is valid (i.e., has neither been cancelled nor expired), then the Logon user message is valid since the associated operation has not been completed (whether by the genuine user or by an impostor resending an intercepted message) because once the associated operation is completed, the token is cancelled (deleted or removed) by the proxy. Upon completing the Logon sequence, the user may securely carry out any number of authorized actions/operations. In summary, to validate each session message the proxy relies on all of: a valid token, a valid user ID, a correct hash value, and confirming that the requesting user is not currently locked out of the system (e.g., Employee terminated). Once the message and user are validated the proxy returns the following message encrypted with the session key and including a new token:

&b(*&%ˆ$#!@!.about.!HARQERafa#$3453466$@$@!%ˆ&&EOT, which the WID would decrypt to:

A Answer

9001 Logon user

AB45C7990E2213D New Token 2.7 Software Version

F Authentication Mode Licensed To: ABC Communications Ltd. License Message

Once the WID and user combination open a session with a proxy it is necessary to confirm what commands the user is permitted to execute on which managed entities. According to an embodiment preferred from a security perspective multiple logons are not permitted for any user, particularly from one WID. However, according to an alternate embodiment for convenience the invention contemplates multiple logons for a single user using more than one valid WID to expedite the administration of multiple managed entities through a single proxy.

Continuing the present example, once a particular user is logged on a request is typically made from the WID to identify which managed entities that user is permitted to access and which commands that user may execute respecting each accessible managed entity.

For example, the following message, encrypted with the session key and containing the last valid token, may be sent by the WID to the proxy:

*#&#%&*ˆ&*Aqtwetyu#$&$HAqWRTY%@ˆ@&*## EOT, which the proxy would decrypt to:

R Request

6000 Servers/Actions

AB45C7990E2213D Token

KEVINSRIMDEVICE WID ID 12-06-2002 Date

14:52:15 Time 2.7 Version Software Version

In response to which the proxy checks its records respecting which managed entities that user is allowed to access and which commands that user is allowed to execute on each managed entity in order to advise the user what he or she may do. Depending how much information must be supplied, the proxy may, in one or more blocks, send to the WID a message like:

ˆ*(%$)(*%%$jaeiBE45234626&*(%&$#(&(*_)*)_
ˆ*%&%ˆ*(%$)(*%%$jaeiBE452

34626&*(%&$#(&(*_)*)_ˆ*%&%ˆ*(%$)
(*%%$jaeiBE45234626&*(%&$#(&(*_)*)_%&%ˆ*(%$)
(*%

%$jaeiBE45234626&*(%&$#(&(*_)*)_ˆ*%&%ˆ*(%$)
(*%%$ja eiBE45234626&*(%&$#(&(*_)*)_ˆ*%&%EOB, to which the WID replies:

ACKEOT, upon receipt of which confirmation the proxy may complete the message by sending:

*#&#%&*ˆ&*Aqtwetyu#$&$HAqWRTY%@ˆ@&*##*#&#%&*A&*Aqtwetyu#$&$

HAqWRTY%@ˆ@&*##*#&#%&*ˆ&*Aqtwetyu#$&$
HAqWRTY%@ˆ@&*##Aqtwetyu#$&$HAqWR

TY%@ˆ@&*##*#&#% EOT

Advantageously, according to a preferred embodiment, such larger messages are broken into blocks (a.k.a. data chunking) and transmitted using multiple packets, which blocks may be identified by adding an EOB tag at the end of each block of a message. Although this is required by some WID technology (e.g., some RIM Blackberry devices) a person of skill in the art would understand that this method of operating a wireless system may be used to transfer the burden of all queuing services to the more powerful proxy thereby increasing WID performance and reducing wireless network overload or flooding problems.

In the foregoing example, the WID could decrypt the authorization information to:

A Answer

6000 Servers/Actions

146745C79902213D New Token 2.7 Software Version

Domain A Domain A

Server 1 Server 1 (e.g., managed entity 1)

TFTTFFFFFFFFFFF Actions allowed on Domain A/Server 1

Domain A Domain A

Server 2 Server 2 (e.g., managed entity 14)

TFTTFFTFFFTFFTT Actions allowed on Domain A/Server 2

Domain B Domain B

Server X Server X (e.g., managed entity 36)

TTTTTTTTTTTTTTT Actions allowed on Domain B/Server X

The action list TTTTTTTTT indicates that this user has access to all available commands on the subject managed entity; whereas an action list of TTFTTFFFFFFFFFFF could, for example, restrict the user to perform only: user, File Explorer and Print Services related operations on the subject managed entity.

Advantageously, according to a preferred embodiment, the WID does not communicate directly with any managed entity—the proxy delivers the required instructions to the managed entity, the proxy prevents user requests, for operations that they are not allowed to perform, from ever reaching the managed entity, thereby enhancing overall system efficiency and security.

The foregoing embodiment may be operated in 2 modes: all user information is as contemplated above unique to the service with no LAN related identifiers ever exchanged outside the firewall, or with user identifiers that relate to the LAN or to a specific managed entity delivered from outside the firewall (but always protected by the security of a Session Key) for further handling by the proxy, never directly from the WID to the managed entity.

Advantageously if mobile Network Administrators enter their LAN user ID and user password through a WID, more detailed logs/records are created that identify which mobile users submitted which commands to each managed entity rather than records showing only that the proxy had submitted commands that it had determined to have come from a user properly authorized to submit the subject command.

Further, the method and system of the present invention is delivered using a novel menu-driven GUI approach to network administration that, much like the Microsoft Windows® interface did for DOS, makes remotely managing a networks more intuitive and accessible to a less skilled user.

Secure Delivery of Telnet Service Behind a Firewall

According to a further embodiment of the system of the present invention Telnet Services may be delivered securely from a wireless device and across the Internet to or from a managed entity behind a firewall by using the proxy technology described herein. Given that the WID is never connected directly to the subject managed entity, advantageously, among the functionality that the WID can request that the proxy provide on its behalf, is a Telnet/SSH connection. If the Telnet/SSH service is already running on the managed entity, since the LAN related user ID and user password are already stored on the proxy (i.e., do not have to be transmitted) they may be supplied to the managed entity and any Telnet/SSH commands mapped to the novel messaging protocol described in detail above will be encoded at the WID for decoding at the proxy and then sent to the managed entity after being authorized in exactly the same manner as all other commands are handled according to the method and system of the present invention. In a particular installation only a subset of Telnet/SSH commands may be mapped to the messaging protocol of the present invention, or the proxy may be used during authorization to restrict access to particular Telnet/SSH commands to particular users respecting particular managed entities.

A further advantage of delivering Telnet/SSH services using the present invention is the ability to communicate with a Microsoft Windows® server even if the Telnet/SSH service is not running, because among the WMI commands that may be encoded in accordance with the messaging protocol of the present invention is the command to start the Telnet/SSH service, which the proxy may send to a managed entity prior to sending any Telnet/SSH command.

Although the disclosure describes and illustrates various embodiments of the invention, it is to be understood that the invention is not limited to these particular embodiments. Many variations and modifications will now occur to those skilled in the art of wirelessly administrating networks. For full definition of the scope of the invention, reference is to be made to the appended claims.

We claim:

1. A method in a system, for securing communication between a wireless input device (WID) and a proxy server, for wirelessly administering at least one managed computer via said proxy server, said proxy server being trusted by said at least one managed computer, said proxy server having access to an encrypted service database for storing information respecting said WID and information respecting at least one user of said WID, said wireless device being constructed and adapted to create and transmit an encoded message, said message including at least one command for at least one managed computer, wherein said at least one command corresponds to and is distinct from one or more operating system (OS) commands for said at least one managed computer, said proxy server constructed and adapted to receive and decode said message, to authenticate said wireless device and to authorize said commands, and to send said one or more OS commands from said proxy server to at least one managed computer, the method comprising:

encoding commands for the purpose of preparing an administrative message for transmission between said wireless input device and said at least one managed computer, via said proxy server, wherein said step of encoding comprises the steps of:

mapping at least one command to an identifier comprising a first symbol, mapping at least one parameter to each said first symbol, mapping at least one value to each said parameter, creating a first symbol-second symbol combination by appending a second symbol to said first symbol for the purpose of defining whether the transmission of said first symbol-second symbol combination is a request for or a confirmation of compliance, defining a sequence according to which said first symbol-second symbol combination will be positioned within said message relative to said value of each said parameter, and assembling said message using said first symbol to represent at least one command recognized by said managed computer, and arranging said first symbol-second symbol combination together with said value of each said parameter in accordance with said sequence.

2. The method as claimed in claim 1 wherein said at least one managed computer comprises a server connected to a local area network.

3. The method as claimed in claim 1 wherein said transmission of said message is via wireless or Internet means or a combination thereof.

4. The method as claimed in claim 1 wherein said message is encoded by applying a symbolic representation of groups of commands.

5. The method as claimed in claim 1 wherein said second message part is decrypted, interpreted, and expanded to obtain said one or more OS commands for transmission from said proxy server to said at least one managed computer.

6. The method as claimed in claim 1 wherein said proxy server authenticates said wireless device by confirming that said wireless device is a device registered on said proxy server or that a user of said wireless device is a user registered on said proxy server.

7. The method as claimed in claim 1 wherein said proxy server authorizes said commands by confirming that a user of said wireless device is permitted to require said at least one managed computer to execute said one or more OS commands.

8. The method as claimed in claim 1 wherein transmission of said OS commands from said proxy server to said at least one managed computer is performed without any connection between said wireless device and said at least one managed computer.

* * * * *